(12) United States Patent
Hall et al.

(10) Patent No.: US 7,966,210 B2
(45) Date of Patent: Jun. 21, 2011

(54) DATA DISTRIBUTION METHOD AND SYSTEM

(75) Inventors: Stephen A. Hall, Alexandria, VA (US); David G. Javdan, Potomac, MD (US); Robert B. Moore, Springfield, VA (US)

(73) Assignee: Landmark NV-S Ventures Group, Inc., Las Vegas, NV (US)

( * ) Notice: Subject to any disclaimer, the term of this patent is extended or adjusted under 35 U.S.C. 154(b) by 72 days.

(21) Appl. No.: 12/244,522

(22) Filed: Oct. 2, 2008

(65) Prior Publication Data

US 2009/0083130 A1    Mar. 26, 2009

Related U.S. Application Data

(63) Continuation of application No. 09/867,416, filed on May 31, 2001, now abandoned.

(51) Int. Cl.
*G06Q 10/00* (2006.01)
*G06Q 30/00* (2006.01)

(52) U.S. Cl. .............. 705/7.29; 705/14.71; 705/26.3; 705/26.4; 705/313

(58) Field of Classification Search ............ 705/10
See application file for complete search history.

(56) References Cited

U.S. PATENT DOCUMENTS

| | | | | |
|---|---|---|---|---|
| 5,323,315 A | * | 6/1994 | Highbloom | 705/38 |
| 5,402,336 A | * | 3/1995 | Spiegelhoff et al. | 705/8 |
| 5,504,674 A | | 4/1996 | Chen et al. | |
| 5,745,882 A | * | 4/1998 | Bixler et al. | 705/14.61 |
| 5,765,138 A | * | 6/1998 | Aycock et al. | 705/7 |
| 5,765,143 A | | 6/1998 | Sheldon et al. | |
| 5,774,873 A | * | 6/1998 | Berent et al. | 705/26 |
| 5,978,776 A | | 11/1999 | Seretti et al. | |
| 6,006,201 A | * | 12/1999 | Berent et al. | 705/27 |
| 6,041,310 A | * | 3/2000 | Green et al. | 705/27 |
| 6,055,504 A | * | 4/2000 | Chou et al. | 705/37 |
| 6,161,099 A | * | 12/2000 | Harrington et al. | 705/36 R |
| 6,341,271 B1 | * | 1/2002 | Salvo et al. | 705/28 |
| 6,397,226 B1 | * | 5/2002 | Sage | 705/22 |
| 6,470,324 B1 | * | 10/2002 | Brown et al. | 705/28 |

(Continued)

OTHER PUBLICATIONS

Duysters, Geert; Kok, Gerard; Vaandrager, Maaike. "Crafting Successful Strategic Technology Partnerships". 1999. R&D Management. vol. 29, Issue 4. pp. 343-351.*

(Continued)

*Primary Examiner* — Peter Choi
(74) *Attorney, Agent, or Firm* — Carlineo, Spicer & Kee, LLC

(57) ABSTRACT

A method for distributing data among automotive dealers, including selecting the data from the dealers, processing the data, and providing the processed data to the dealers while maintaining confidentiality of individual data of each dealer. The selecting of the data further includes collecting data indicating which vehicles are in demand. The data includes at least one of a number of a vehicle's make a dealer has in stock, a vehicle identification number, a vehicle's year, a vehicle's make, a vehicle's model, a vehicle's body style, a vehicle's exterior color, a vehicle's interior color, a vehicle's mileage, a vehicle's retail asking price, a vehicle's transactions cost, a vehicle's reconditioning cost, a vehicle's age, a vehicle's selling price, a vehicle's gross profit, an acquisition need of a vehicle, a selling need of a vehicle, a vehicle's image, a vehicle's turnover rate, or an aggregate of any of the above-listed data. The distributed data may provide optimization on return on investments to the dealers.

12 Claims, 22 Drawing Sheets

U.S. PATENT DOCUMENTS

| | | | | |
|---|---|---|---|---|
| 6,647,373 | B1* | 11/2003 | Carlton-Foss | 705/37 |
| 6,647,374 | B2* | 11/2003 | Kansal | 705/37 |
| 6,711,495 | B1 | 3/2004 | Ukai et al. | |
| 6,778,968 | B1* | 8/2004 | Gulati | 705/36 R |
| 6,868,389 | B1* | 3/2005 | Wilkins et al. | 705/10 |
| 6,877,034 | B1* | 4/2005 | Machin et al. | 709/223 |
| 6,920,433 | B1 | 7/2005 | Seretti et al. | |
| 6,980,963 | B1 | 12/2005 | Hanzek | |
| 7,013,292 | B1* | 3/2006 | Hsu et al. | 705/37 |
| 7,133,842 | B2* | 11/2006 | Harif | 705/37 |
| 7,200,571 | B1* | 4/2007 | Jenniges et al. | 705/37 |
| 7,216,094 | B2* | 5/2007 | Ly et al. | 705/26.5 |
| 7,219,080 | B1 | 5/2007 | Wagoner et al. | |
| 7,231,363 | B1 | 6/2007 | Hughes et al. | |
| 7,251,609 | B1* | 7/2007 | McAlindon et al. | 705/3 |
| 7,251,630 | B1* | 7/2007 | Gupta et al. | 705/37 |
| 7,383,203 | B1* | 6/2008 | Feldstein et al. | 705/14.67 |
| 7,509,261 | B1* | 3/2009 | McManus et al. | 705/313 |
| 7,577,582 | B1* | 8/2009 | Ojha et al. | 705/26.3 |
| 7,596,509 | B1* | 9/2009 | Bryson | 705/27.2 |
| 7,627,503 | B1* | 12/2009 | Champagne et al. | 705/26.5 |
| 7,765,140 | B1* | 7/2010 | Megiddo | 705/37 |
| 2001/0032156 | A1* | 10/2001 | Candura et al. | 705/36 |
| 2001/0034631 | A1* | 10/2001 | Kiselik | 705/8 |
| 2002/0002526 | A1* | 1/2002 | Kotas | 705/37 |
| 2002/0082882 | A1* | 6/2002 | Perry et al. | 705/7 |
| 2002/0082978 | A1* | 6/2002 | Ghouri et al. | 705/37 |
| 2002/0087473 | A1* | 7/2002 | Harif | 705/44 |
| 2002/0138334 | A1* | 9/2002 | DeCotiis et al. | 705/10 |
| 2002/0194117 | A1* | 12/2002 | Nabe et al. | 705/38 |
| 2003/0014326 | A1* | 1/2003 | Ben-Meir et al. | 705/26 |
| 2003/0158776 | A1* | 8/2003 | Landesmann | 705/14 |

OTHER PUBLICATIONS

Kumar, Nirmalya. "The Power of Trust in Manufacturer-Retailer Relationships". Nov.-Dec. 1996. Harvard Business Review. pp. 92-106.*

Kumar, Nirmalya; Stern, Louis W.; Achrol, Ravi S.; "Assessing Reseller Performance From the Perspective of the Supplier". May 1992. Journal of Marketing Research. vol. 29, Issue 2. pp. 238-253.*

Lau, H.C.W.; Lee, W.B.; Lau, Peter K.H.; "Development of an Intelligent Decision Support System for Benchmarking Assessment of Business Partners". 2001. Benchmarking. vol. 8, Issue 5. pp. 376-395.*

Reinmuth, James E. "Forecasting the Impact of a New Product Introduction". Spring 1974. Academy of Marketing Science Journal.*

"Power Information Network". J.D. Power and Associates. retrieved from <http://www.powerinfonet.com>. archived Mar. 8, 2000.*

Venkatraman, N.; Ramunajam, Vasudevan. "Measurement of Business Performance in Strategy Research: A Comparison of Approaches". Oct. 1986. The Academy of Management Review. vol. 11, No. 4.*

Jacobson, Robert. "The Validity of ROI as a Measure of Business Performance". Jun. 1987. vol. 77. No. 3.*

* cited by examiner

| | | 356 | 358 | 360 | | 362 | 364 |
|---|---|---|---|---|---|---|---|
| | VIN 352 | Year | Make | Model | | Mileage | Color |
| | 1HGCB755XMA110355 | 1991 | HONDA | ACCORD | | 117043 | BLUE |
| | | | | Offers 370 | | | 372 |
| | 366 | 368 | | Offer Date | | | Dealer Name |
| | High Offer Amount | Site Area | | | | | |
| 374 ~ | $2600 Sell Now? ~ 376 | WC | | 4/28/2001 1:04:35 PM | | | Ed Scherl Ent. Inc |
| | $2500 Sell Now? | WC | | 4/28/2001 10:41:04 AM | | | Car World Inc. |
| | $2559 Sell Now? | WC | | 4/25/2001 6:49:33 PM | | | Car World Inc |

Wholesale Center Offer

| | |
|---|---|
| Year | 1996 |
| Make | CHEVRO |
| Model | MONTE CARLO |
| Mileage | 96637 |
| Color | BLACK |
| VIN | 2G1WX12X4T9277503 |

Make Your Offer

375 ~ Minimum: $0

380 ~ Maximum: $0     SUBMIT ~ 390

Leave 'Minimum' empty to submit one offer.

385 ~ (Enter Comment Above)

*Fig. 3(c)*

Retail Sales Trends

| Make* | Model* | Metrics | Qty Sold Last 6 mo | Qty Sold Last 90 days | Qty Sold Last 60 days | Qty Sold Last 30 days | Current Stock |
|---|---|---|---|---|---|---|---|
| | 626 | | 72 | 50 | 38 | 29 | 10 |
| | PROTEGE-4 CYL | | 28 | 17 | 15 | 7 | 6 |
| MAZDA | MPV-V6 | | 21 | 15 | 11 | 6 | 1 |
| | MILLENIA-V6 | | 17 | 11 | 8 | 7 | 3 |
| | B SERIES PICKUP | | 7 | 3 | 3 | 3 | 1 |
| FORD | CONTOUR-4 CYL | | 5 | 4 | 2 | 2 | 0 |
| JEEP | GRAND CHEROKEE-6 CYL. | | 5 | 2 | 2 | 1 | 1 |
| CHEVROLET | MALIBU-V6 | | 3 | 2 | 2 | 0 | 0 |
| MERCURY | SABLE-V6 | | 3 | 2 | 2 | 1 | 0 |
| TOYOTA | CAMRY | | 3 | 1 | 1 | 1 | 0 |
| ACURA | TL-5 CYL. | | 2 | 2 | 2 | 2 | 0 |
| FORD | TAURUS-V6 | | 2 | 1 | 1 | 0 | 0 |
| FORD TRUCK | EXPLORER-V6 | | 2 | 1 | 0 | 0 | 0 |
| MAZDA | MX-5 MIATA-4 CYL. | | 2 | 1 | 1 | 1 | 1 |
| MITSUBISHI | GALANT-4 CYL. | | 2 | 2 | 2 | 0 | 0 |
| NISSAN/DATSUN | SENTRA-4 CYL. | | 2 | 2 | 1 | 0 | 0 |
| TOYOTA | COROLLA-4 CYL. | | 2 | 1 | 1 | 0 | 0 |
| BUICK | REGAL CUSTOM-V6 | | 1 | 0 | 0 | 0 | 0 |
| CHEVROLET | LUMINA-V6 | | 1 | 0 | 0 | 0 | 0 |
| CHEVROLET TRUCK | S10 PICKUP-V6 | | 1 | 1 | 1 | 1 | 0 |
| CHRYSLER | 300M-V6 | | 1 | 0 | 0 | 0 | 0 |
| | CIRRUS | | 1 | 1 | 0 | 0 | 0 |
| HONDA | ACCORD | | 1 | 0 | 0 | 0 | 0 |
| | PASSPORT-V6 | | 1 | 1 | 0 | 0 | 0 |
| HYUNDAI | TIBURON-4 CYL. | | 1 | 0 | 0 | 0 | 0 |
| JEEP | GRAND CHEROKEE-V8 | | 1 | 1 | 0 | 0 | 0 |
| MAZDA | B4000 PICKUP-V6 | | 1 | 0 | 0 | 0 | 0 |
| | TRIBUTE | | 1 | 1 | 1 | 0 | 0 |
| MERCURY | MYSTIQUE-4 CYL. | | 1 | 0 | 0 | 0 | 0 |
| MITSUBISHI | MIRAGE-4 CYL. | | 1 | 0 | 0 | 0 | 0 |
| NISSAN/DATSUN | MAXIMA-V6 | | 1 | 0 | 0 | 0 | 2 |

*Fig. 4*

Vehicles to Watch

| Stock Number 614 | Year 616 | Make* 618 | Model* 620 | Warning 612 | Metrics 602 | Curr Days in Stock 622 | Avg Days in Stock 624 | Avg Gross Profit 626 | Avg ROI |
|---|---|---|---|---|---|---|---|---|---|
| A14591 | 1999 | VOLKSWAGEN | NEW BEETLE-4 CYL | No History Available 604 | | 17 | N/A | N/A | N/A |
| A14414 | 1998 | SUBARU | FORESTER-4 CYL. | No History Available | | 18 | N/A | N/A | N/A |
| P3292 | 2000 | FORD | FOCUS-4 CYL. | No History Available | | 0 | N/A | N/A | N/A |
| H3279 | 1999 | MAZDA | B2500 PICKUP-4 CYL. | No History Available | | 6 | N/A | N/A | N/A |
| H3217B | 1993 | FORD | ESCORT | No History Available | | 1 | N/A | N/A | N/A |
| H3296 | 1998 | NISSAN/DATSUN | MAXIMA-V6 | Below Minimum ROI 606 | | 0 | 44 | $ 355 | 19% |
| H3299 | 1998 | NISSAN/DATSUN | MAXIMA-V6 | Below Minimum ROI | | 0 | 44 | $ 355 | 19% |
| P3241 | 2000 | MAZDA | MX-5 MIATA-4 CYL. | Add Description 608 Over Age 610 Wholesale | | 64 | 33 | N/A | 31% |
| H3283 | 1997 | MAZDA | MX-5 MIATA-4 CYL. | Below Minimum ROI | | 6 | 33 | N/A | 31% |
| P3245 | 1999 | FORD | CONTOUR-4 CYL. | Add Description \| Over Age - Wholesale | | 50 | 18 | $ 1,548 | N/A |

Rows: 10  Columns: 4

Welcome to Pricedrive

Consider for Wholesale Center

| 802 Stock | 804 Year | 806 Make | 808 Model | 810 Mileage | 812 Current Days In Stock | 814 6mo Avg. Gross Profit | 816 6mo Avg. ROI % | 818 Warning | 820 Move to WC? |
|---|---|---|---|---|---|---|---|---|---|
| SORT | SORT | SORT | SORT | SORT | SORT | SORT | SORT | SORT | |
| H32178 | 1993 | FORD | ESCORT | | 1 | N/A | N/A | No History Available | ☐ |
| P3292 | 2000 | FORD | FOCUS-4 CYL. | 4900 | 0 | N/A | N/A | No History Available | ☐ |
| H3296 | 1998 | NISSAN/DATSUN | MAXIMA-V6 | 35966 | 0 | $355 | 19% | Below Minimum ROI | ☐ |
| H3299 | 1998 | NISSAN/DATSUN | MAXIMA-V6 | 30910 | 0 | $355 | 19% | Below Minimum ROI | ☐ |
| H3279 | 1999 | MAZDA | B2500 PICKUP-4 CYL. | 31762 | 6 | N/A | N/A | No History Available | ☐ |
| H3283 | 1997 | MAZDA | MX-5 MIATA-4 CYL. | 34923 | 6 | N/A | 31% | Below Minimum ROI | ☐ |
| A14414 | 1998 | SUBARU | FORESTER-4 CYL. | 52403 | 18 | N/A | N/A | No History Available | ☐ |
| A14591 | 1999 | VOLKSWAGEN | NEW BEETLE-4 CYL. | 17806 | 17 | N/A | N/A | No History Available | ☐ |

Total vehicles = 8

Select All | Clear All | Update

ACTION PLAN

| Stock Number 1002 | Year 1004 | Make* 1006 | Model* 1008 | Warning* 1010 | Metrics | Current Days in Stock 1012 | RO 1014 |
|---|---|---|---|---|---|---|---|
| P3241 | 2000 | MAZDA | MX-5 MIATA-4 CYL | Add Description \| Over Age - Wholesale I | | 64 | 31% |
| P3245 | 1999 | FORD | CONTOUR-4 CYL. | Add Description \| Over Age - Wholesale I | | 50 | N/A |
| H3283 | 1997 | MAZDA | MX-5 MIATA-4 CYL. | Below Minimum ROI I | | 6 | 31% |
| H3296 | 1998 | NISSAN/DATSUN:MAXIMA-V6 | | Below Minimum ROI I | | 0 | 19% |
| H3299 | 1998 | NISSAN/DATSUN:MAXIMA-V6 | | Below Minimum ROI I | | 0 | 19% |

Activity Summary for Baltimore – Washington Vehicles

Vehicles

- 1102 — Dealer Inventory: 63 Total Browns Mazda Fairfax Vehicles
- 1110 — Retail Showroom: 43 Browns Mazda Fairfax Vehicles (2348 Total Vehicles)
- 1112 — Wholesale Center: 20 Browns Mazda Fairfax Vehicles (119 Total Vehicles)
- 1114 — Appraisal Activity: 1 Browns Mazda Fairfax Vehicles (1 Total Vehicles)

Offers

- 1104 — Total Offers: 2 Total Offers
- 1116 — Retail Showroom: 2 Offers
- 1118 — Wholesale Center: 0 Offers
- 1120 — Appraisal Activity: 0 Offers

24-hour Vehicle History

|  | New Vehicles | Deleted Vehicles |
|---|---|---|
| Retail Showroom: | 1124 — 0 New Vehicles | 0 Deleted Vehicles — 1124 |
| Wholesale Center: | 1128 — 0 New Vehicles | 0 Deleted Vehicles — 1128 |
| Appraisal Activity: | 1132 — 0 New Vehicles | 0 Deleted Vehicles — 1132 |
| Total: | 1106 — *0 New Vehicles* | *0 Deleted Vehicles* — 1108 |

Retail Inventory Value Report

| 1202 Stock Number△ | 1204 Year△ | 1206 Make*△ | 1208 Model*△ | Metrics ▽ | 1210 Mileage ▽ | 1212 Retail Price ▽ | 1214 Vehicle ACV ▽ | Black Book Value (Avg Book) ▽ | 1218 NADA (Trade Value) ▽ | 1220 Curr Days in Stock |
|---|---|---|---|---|---|---|---|---|---|---|
| P3245 | 1999 | FORD | CONTOUR-4 CYL. | | 32,165 | $12,995 | $9,514 | $7650 | $8575 | 50 |
| H3217B | 1993 | FORD | ESCORT | | N/A | N/A | N/A | N/A | $2190 | 1 |
| P3292 | 2000 | FORD | FOCUS-4 CYL. | | 4,900 | $13,995 | $8,993 | $9725 | $10225 | 0 |
| H3273 | 1998 | JEEP | GRAND CHEROKEE-6 CYL. | | 34,816 | $18,995 | $15,289 | CK Book | $15425 | 35 |
| H3258 | 1998 | MAZDA | 626 | | 31,148 | $13,798 | $10,649 | CK Book | CK Book | 43 |
| H3281 | 1998 | MAZDA | 626 | | 30,465 | $13,995 | $11,006 | CK Book | CK Book | 14 |
| P3290 | 1998 | MAZDA | 626 | | 45,134 | $15,995 | $12,247 | $8400 | CK Book | 0 |
| H3288 | 1998 | MAZDA | 626 | | 36,016 | $13,785 | $10,665 | CK Book | CK Book | 10 |
| H3282 | 1998 | MAZDA | 626 | | 36,100 | $13,495 | $10,008 | CK Book | CK Book | 6 |
| H3287 | 1998 | MAZDA | 626 | | 35,955 | $13,495 | $11,026 | $8700 | CK Book | 6 |
| H3293 | 1998 | MAZDA | 626 | | 36,255 | $13,995 | $8,665 | CK Book | CK Book | 1 |
| H3294 | 1998 | MAZDA | 626 | | 37,951 | $14,995 | $10,256 | CK Book | CK Book | 1 |
| H32661 | 1996 | MAZDA | 626 | | 46,985 | N/A | $5,500 | CK Book | CK Book | 5 |
| H3279 | 1999 | MAZDA | B2500 PICKUP-4 CYL. | | 31,762 | $11,995 | $8,840 | CK Book | CK Book | 6 |
| P3291 | 1998 | MAZDA | MILLENIA-V6 | | 17,360 | $18,995 | $15,210 | $12900 | $15700 | 0 |
| H3297 | 1998 | MAZDA | MILLENIA-V6 | | 23,632 | $18,995 | $15,544 | $12725 | $15475 | 0 |
| H3295 | 1998 | MAZDA | MILLENIA-V6 | | 36,690 | $17,995 | $15,166 | $12250 | $14825 | 0 |
| P3286 | 1998 | MAZDA | MPV-V6 | | 37,816 | $18,995 | N/A | CK Book | CK Book | 10 |
| P3241 | 2000 | MAZDA | MX-5 MIATA-4 CYL. | | 6,752 | $18,895 | $13,891 | CK Book | CK Book | 64 |
| H3283 | 1997 | MAZDA | MX-5 MIATA-4 CYL. | | 34,923 | $14,995 | $10,873 | CK Book | CK Book | 6 |

Rows: 30 Columns: 6 (1216)

Market Performance By Make And Model ~ 1300

Make: MAZDA ~1302  Model: 626 ~1304

| 1306 Price Range | 1312 Sold Last 6 Months | Sold Last 90 Days | Sold Last 60 Days | Sold Last 30 Days | 1314 Current Stock | 1316 6mo Avg Gross Profit | 1318 6mo Avg Days To Retail | 1320 6mo Avg ROI |
|---|---|---|---|---|---|---|---|---|
| N/A | 21 | 9 | 4 | 2 | 1 | $1322 | 18 | N/A |
| $1-$5000 | 6 | 2 | 1 | 1 | 1 | $1377 | 17 | 860% |
| $5001-$10000 | 34 | 22 | 12 | 6 | 8 | $1955 | 32 | 642% |
| $10001-$15000 | 103 | 55 | 39 | 19 | 11 | $1538 | 33 | 281% |
| $15001-$20000 | 2 | 0 | 0 | 0 | 0 | N/A | 14 | N/A |

| 1308 Mileage | Sold Last 6 Months | Sold Last 90 Days | Sold Last 60 Days | Sold Last 30 Days | Current Stock | 6mo Avg Gross Profit | 6mo Avg Days To Retail | 6mo Avg ROI |
|---|---|---|---|---|---|---|---|---|
| N/A | 1 | 0 | 0 | 0 | 0 | $31 | N/A | N/A |
| 1-20000 | 16 | 5 | 3 | 2 | 4 | $1333 | 29 | 242% |
| 20001-40000 | 110 | 59 | 39 | 21 | 13 | $1418 | 32 | 247% |
| 40001-60000 | 22 | 18 | 11 | 4 | 3 | $1148 | 21 | 329% |
| 60001-80000 | 12 | 6 | 2 | 1 | 0 | $1914 | 37 | 1008% |
| 80001-100000 | 2 | 1 | 0 | 0 | 0 | $425 | 28 | N/A |
| 100001+ | 3 | 1 | 1 | 0 | 1 | $102 | 39 | N/A |

| 1310 Year | Sold Last 6 Months | Sold Last 90 Days | Sold Last 60 Days | Sold Last 30 Days | Current Stock | 6mo Avg Gross Profit | 6mo Avg Days To Retail | 6mo Avg ROI |
|---|---|---|---|---|---|---|---|---|
| 2000 | 14 | 4 | 2 | 1 | 3 | $1102 | 33 | 161% |
| 1999 | 6 | 3 | 1 | 1 | 1 | N/A | 41 | N/A |
| 1998 | 118 | 69 | 46 | 23 | 11 | $1843 | 28 | 463% |
| 1997 | 15 | 5 | 2 | 1 | 3 | $1352 | 43 | 309% |
| 1996 | 5 | 3 | 3 | 1 | 0 | $1155 | 28 | 439% |
| 1995 | 3 | 2 | 1 | 1 | 0 | $1708 | 31 | 518% |
| 1994 | 1 | 0 | 0 | 0 | 0 | $2334 | 22 | 1778% |
| 1993 | 2 | 1 | 0 | 0 | 0 | $1149 | 26 | 880% |
| 1991 | 1 | 0 | 0 | 0 | 0 | N/A | N/A | N/A |

| To Do List | Daily Reports | Research a Vehicle | Dealership Inventory | Appraisal Center | Retail Showroom | Wholesale Center | Buy List |

Available Inventory Report — 1400

| 1402 | 1404 | 1406 | 1408 | 1410 | 1412 | 1414 | 1416 | 1418 |
|------|------|------|------|------|------|------|------|------|
| Year | Make | Model | Mileage | Color | Area | Dealership Name | Dealership Contact Name | Dealership Contact Number |
| SORT | SORT | SORT | SORT | SORT | SORT | SORT | SORT | SORT |
| 2000 | MAZDA | MPV-V6 | 60000 | BLACK | WC | Browns Mazda Alexandria | Mark Moonville | 703.660.8400 |
| 1996 | MAZDA | PROTEGE-4 CYL | 60000 | BLACK | WC | Browns Mazda Alexandria | Mark Moonville | 703.660.8400 |

1420

Total vehicles = 2

Printer friendly version on this page — 1422

| | To Do List | Daily Reports | Dealer Inventory | Appraisal Activity | Retail Showroom | Wholesale Center | Buy List |
|---|---|---|---|---|---|---|---|

1502 Dealership: Top Performing Retail Vehicles
Click to sort the Dealer Top Performance Report 1518

| 1504 Year | 1506 Make | 1508 Model | 1510 Volume Sold | 1512 Avg. Gross Profit | 1514 Avg. Days to Retail | 1516 Avg. ROI |
|---|---|---|---|---|---|---|
| 1995 | MAZDA | MPV-V6 | 1 | $ 2,772 | 3 | 5529% |
| 1994 | MAZDA | MX-5 MIATA-4 CYL | 2 | $ 3,454 | 8 | 2803% |
| 1996 | MAZDA | 626 | 1 | $ 1,690 | 5 | 1735% |
| 1995 | TOYOTA | TACOMA | 1 | $ 1,895 | 14 | 634% |
| 1996 | MAZDA | MX-5 MIATA-4 CYL | 1 | $ 2,700 | 12 | 777% |
| 1996 | MAZDA | MPV-V6 | 1 | $ 1,266 | 7 | 738% |
| | FORD TRUCK | EXPEDITION-V8 | 1 | $ 2,458 | 7 | 731% |
| 1998 | SUBARU | IMPREZA-4 CYL | 1 | $ 1,800 | 11 | 606% |
| | MAZDA | PROTEGE-4 CYL | 11 | $ 1,061 | 23 | 505% |
| 1996 | PLYMOUTH | NEON-4 CYL | 1 | $ 878 | 17 | 483% |
| 1999 | MAZDA | B3000 PICKUP-V6 | 2 | $ 1,551 | 30 | 382% |
| 1998 | MAZDA | MPV-V6 | 5 | $ 1,764 | 21 | 371% |
| | | MILLENIA-V6 | 9 | $ 2,100 | 36 | 369% |
| 1997 | MAZDA | MPV-V6 | 3 | $ 1,525 | 20 | 341% |
| 1998 | MAZDA | 626 | 36 | $ 1,367 | 33 | 325% |

1520 Market: Top Performing Retail Vehicles
Click to sort the Market Top Performance Report 1536

| 1522 Year | 1524 Make | 1526 Model | 1528 Volume Sold | 1530 Avg. Gross Profit | 1532 Avg. Days to Retail | 1534 Avg. ROI |
|---|---|---|---|---|---|---|
| 1995 | TOYOTA | CAMRY | 6 | $ 2,759 | 32 | 2946% |
| 1998 | CHEVROLET | CAVALIER RS-L4 | 7 | $ 1,550 | 46 | 2675% |
| 1994 | TOYOTA | CAMRY | 3 | $ 1,569 | 12 | 2184% |
| 1999 | ISUZU | RODEO-V6 | 4 | $ 2,440 | 20 | 1727% |
| | DODGE TRUCK | GRAND CARAVAN-V6 | 2 | $ 2,260 | 32 | 1611% |
| 1998 | TOYOTA | COROLLA-4 CYL | 4 | $ 2,072 | 19 | 1368% |
| 1998 | JEEP | GRAND CHEROKEE-V8 | 7 | $ 2,317 | 21 | 1350% |
| 1997 | PLYMOUTH | VOYAGER-V6 | 3 | $ 2,710 | 10 | 1342% |
| 1998 | DODGE TRUCK | CARAVAN-V6 | 4 | $ 2,641 | 19 | 1330% |
| 1997 | DODGE TRUCK | RAM VAN 2500-V8 | 6 | $ 746 | 96 | 1044% |
| 1995 | NISSAN/DATSUN | SENTRA-4 CYL | 4 | $ 860 | 19 | 1004% |
| 1997 | TOYOTA | CAMRY | 14 | $ 1,495 | 59 | 910% |
| 1995 | HONDA | ACCORD | 3 | $ 2,080 | 12 | 899% |
| 1997 | SATURN | SATURN-4 CYL | 10 | $ 696 | 60 | 897% |

Fig. 15  1500

DATA DISTRIBUTION METHOD AND SYSTEM

CROSS REFERENCE TO RELATED APPLICATION

This application is a continuation of U.S. patent application Ser. No. 09/867,416, filed May 31, 2001, now abandoned and entitled Data Distribution Method and System, the entire disclosure of which is incorporated herein by reference.

BACKGROUND OF THE INVENTION

1. Field of the Invention

The present invention generally relates to E-Commerce, and more specifically, to apparatuses, systems, and methods for distributing data.

2. Description of Related Art

Doing business on the World Wide Web ("Web") has become increasingly popular and is one of the fastest growing uses of the Internet, which is a collection of numerous individual networks. Each network cooperates with other networks to direct Internet traffic so that information can pass among them. The protocols used on the Internet are the Transmission Control Protocol (TCP) and the Internet Protocol (IP, which are frequently referred to as TCPIIP. TCP breaks down and reassembles packets of information, whereas IP ensures that the packets are sent to the right destination or network.

The Web generally operates on a client/server model; that is, a user (e.g., a client) runs a piece of software on his/her personal computer to use the resources of a host (e.g., a server computer). The host allows many different users to access its resources at the same time and need not be dedicated to providing resources to a single user. In this model, the client software—e.g., a browser—runs on the user's computer, which contacts a Web server and requests information or resources. The Web server locates and then sends the information or resources to the browser, which displays the results on the user's computer by interpreting the received Hypertext Markup Language (HTML) document.

The addressee reference information on the Web is known as the Uniform Resource Locator (URL). A user's browser sends the URL using the Hypertext Transfer Protocol (HTTP), which defines the way the browser and the Web server communicate with each other. When the server finds the requested document, it sends the document back to the user's browser. The information is then presented to the user via the user's computer. In effect, the user requests the services of the host, which may involve searching for information and sending it back to the user by querying a database on the Web, delivering requested Web pages, or doing business on-line.

SUMMARY OF THE INVENTION

An embodiment of the invention relates to a method for distributing data among users of the web site (including, e.g., automotive dealers, manufacturers, fleet lease companies), or anyone who may have a use for such data. The method of the invention comprises selecting the data from the dealers, processing the data, and providing the processed data to the dealers while maintaining confidentiality of individual data of each automotive dealer. The selecting of the data may include collecting data indicating, for example, which vehicles are in demand. The data for vehicles may include a vehicle's make, a number of a vehicle's make a dealer has in stock, a vehicle identification number, a vehicle's year, a vehicle's model, a vehicle's body style, a vehicle's color, a vehicle's mileage, a vehicle's retail asking price, a vehicle's transactions cost, a vehicle's reconditioning cost, a vehicle's age, a vehicle's selling price, a vehicle's gross profit, an acquisition need of a vehicle, a selling need of a vehicle, a vehicle's image, a vehicle's turnover rate, or an aggregate of any of the above-listed data. The shared data of the invention may enable dealers to improve return on investments (ROIs).

The invention may optionally create online trading communities, provide real-time market information, as well as access to a broader market of prospective buyers and sellers who are in need of the vehicles. The invention may also allow dealers to provide each other with any product for which they have a desire for, and notify each other if the product becomes available. In addition, an appraisal of the product may be provided on a web site. The invention may earn revenue by charging member participants fees for usage of its services (e.g., based on a flat rate over a period of time or a per-vehicle rate), as well as earning fees from lenders, insurance companies, transportation companies, and the sales of market information to third parties.

BRIEF DESCRIPTION OF THE DRAWINGS

The accompanying drawings, which are incorporated in and constitute a part of this specification, illustrate exemplary embodiments of the invention and, together with the description, explain various aspects and principles of the invention. In the drawings:

FIG. 3(b) is a screenshot showing "Wholesale Center Offers" under the "Wholesale Center" category of the main menu of the exemplary web site;

FIG. 3(c) is a screenshot showing how to "Make Your Offer" under the "Wholesale Center7" category of the main menu of the exemplary web site;

FIG. 4 is a screenshot of "Retail Sales Trend", which is a link from "Review Retail Purchase Needs" under the "To Do List" category of the main menu of the exemplary web site;

FIG. 6 is a screenshot showing "Vehicles to Watch" under the "To Do List" category of the main menu of the exemplary web site;

FIG. 8 is a screenshot listing vehicles that are "Consider[ed] for Wholesale Center" under the "To Do List" category of the main menu of the exemplary web site;

FIG. 10 is a screenshot of the "Action Plan" under the "To Do List" category of the main menu of the exemplary web site;

FIG. 11 is a screenshot showing "Activity Summary for Baltimore-Washington Vehicles", which is a link from "Review Activity Summary" under the "To Do List" category of the main menu of the exemplary web site;

FIG. 12 is a screenshot of a "Retail Inventory Value Report" under the "Daily Reports" category of the main menu of the exemplary web site;

FIG. 13 is a screenshot of a "Market Performance by Make and Model" report under the "Daily Reports" category of the main menu of the exemplary web site;

FIG. 14 is a screenshot of an "Available Inventory Report" under the "Daily Reports" category of the main menu of the exemplary web site;

FIG. 15 is a screenshot of a "Top Performing Vehicles" report under the "Daily Reports" category of the main menu of the exemplary web site;

DETAILED DESCRIPTION OF THE INVENTION

The invention is directed to apparatuses, systems and methods for distributing data among dealers. As an example, in the automobile market, one of the most important factors in profitability is the efficiency with which vehicles are bought and sold. As vehicles for sale remain in inventories, the profit margin on every vehicle is reduced by cost incurred from depreciation, interest, repairs, and floor planning.

The following description refers to the accompanying drawings, which illustrate exemplary embodiments of the invention. Other embodiments are possible and modifications may be made to the exemplary embodiments without departing from the spirit and scope of the invention. Therefore, the following description is not meant to limit the invention. Rather, the scope of the invention is defined by the appended claims.

Figure 1:
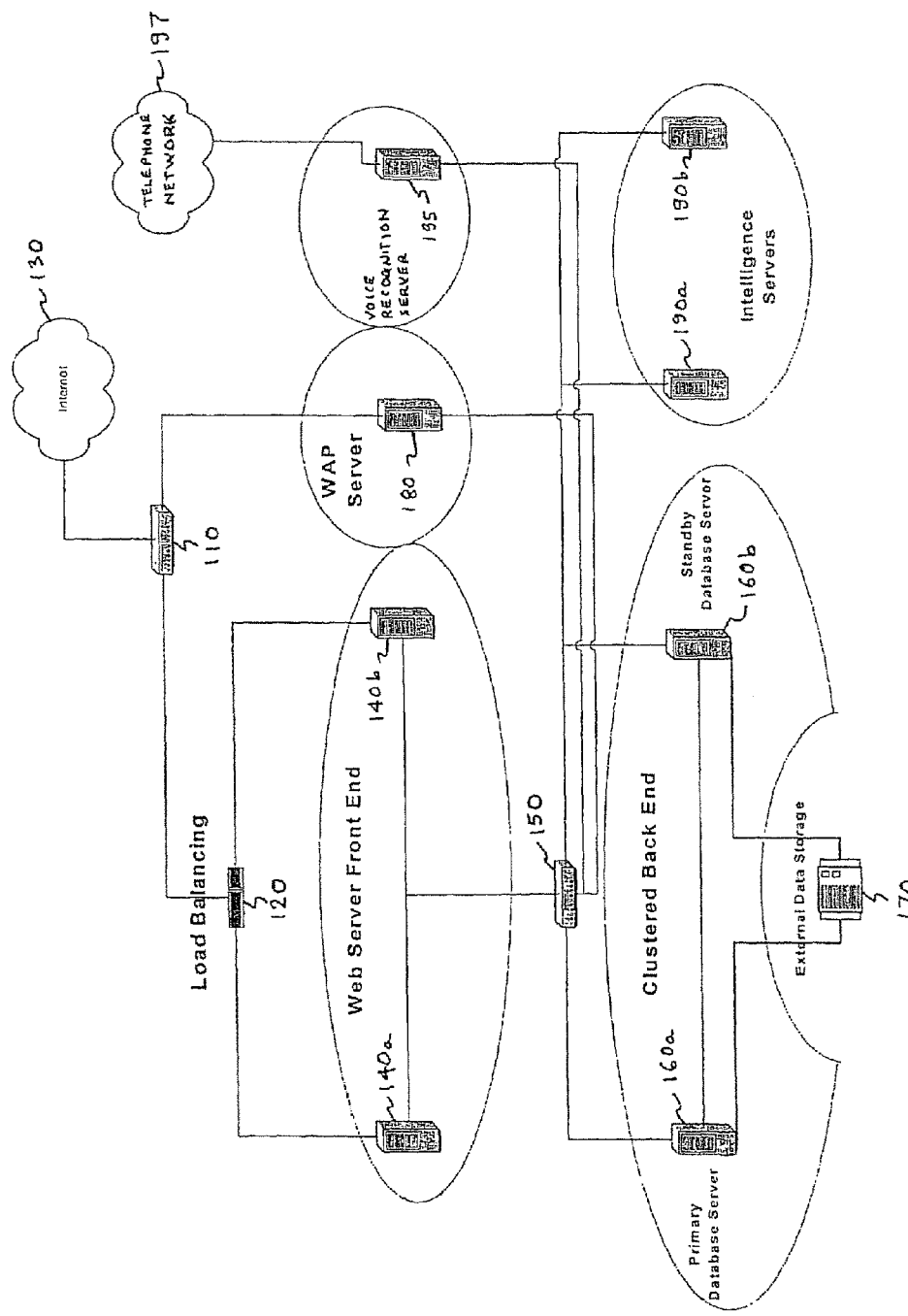
FIG. 1 is a diagram of a computer network representing an exemplary web site.

FIG. 1 is a diagram illustrating one exemplary computer network on which an apparatus, system, and method for distributing data among dealers can be implemented. For example, in the used vehicles business, sharing vehicle data with other dealers provides each dealer the ability to identify which dealers in a region have an immediate need for vehicles that they want to sell right away. For auto dealers, the ability to find and purchase the most desirable and available used vehicles as well as locate prospective retail customers in their region for specific vehicles give them a competitive financial advantage.

As shown in FIG. 1, a computer network 100 representing an exemplary web site may include a first router 110, a load balancing device 120, front-end Web servers 140a and 140b, a second router 150, clustered back-end servers 160a and 160b, an external data storage device 170, a Wireless Protocol (WAP) server 180, intelligence servers 190a and 190b, and a voice recognition server 195. The first router 110 allows communication between the web site and a publicly accessible network such as the Internet 130.

The first router 110 is coupled to the load balancing device 120, which is coupled to the front-end Web servers 140a and 140b (which mirror each other for fail-over routing), and the WAP server 180. The load balancing device 120 operates to balance data load and to direct data to the front-end Web servers 140a and/or 140b. The front-end Web servers 140a and 140b operate to provide a user with requested information, and the WAP server 180 provides wireless capabilities to users as further described below. The frontend Web servers 140a and 140b and the WAP server 180 are coupled to the second router 150. The second router 150 operates to connect the front-end Web servers 140a and 140b and the WAP server 180 to the clustered back-end servers 160a and 160b and to the intelligence servers 190a and 190b. The clustered back-end servers 160a and 160b operate to process requests for data that is transactional in nature, while the intelligence servers 190a and 190b operate to process requests for data that is non-transactional or historical in nature. Of course, servers 160a and 160b could also process requests for data that is non-transactional or historical in nature eliminating the need for servers 190a and 190b. The clustered back-end servers 160a and 160b are coupled to the external data storage device 170, which stores users' data or information to be processed. An example of the first and second routers 110 and 150 are CISCOC® routers.

The computer network 100 may provide for Web usage, WAP usage, voice recognition usage, pushing data, and other foreseeable functions as further discussed below. When a user enters the web site, the session (e.g. general site navigation, page-to-page, etc.) resides in the front-end Web servers 140a and/or 140b. If a user makes a request for data that is transactional in nature, then the data is collected from the external data storage device 170 and is processed through the clustered back-end servers 160a and/or 160b. The processed data is then returned to the user at the front-end Web servers 140a and/or 140b. If, however, the user makes a request for data that is non-transactional or historical in nature, then the data is processed via the intelligence servers 190a and/or 190b. The intelligence servers 190a and/or 190b grab data from the external data storage device 170 through the clustered back-end servers 160a and/or 160b and process the request. The intelligence servers 190a and/or 190b then send the processed request results (non-transactional or historical data) to the user at the front-end Web servers 140a and/or 140b.

When a user accesses the system through a WAP device, the data is transferred through the Internet 130 and the first router 110 to the WAP server 180. The session resides on the WAP server 180. Requested data is collected from the external data storage device 170 and is processed through the clustered back-end servers 160a and/or 160b. The processed data is then returned to the user through the WAP server 180.

Similarly, when a user accesses the system through telephone network 197, the session would reside on the voice recognition server 195. When the user requests data via the telephone network 197, the data is collected from the external data storage device 170 and is processed through the clustered backend servers 160a and/or 160b. The processed data is then returned to the user through voice recognition server 195.

With WAP or telephone access, a user is able to perform many of the functions described below relative to access over the Internet. Such functions include locating vehicles; adding, modifying or deleting vehicles to/in/from the inventory; or monitoring recent transactions (e.g., last 24 hours).

As to pushing data, any information that is pushed from the computer network 100, e.g., alerts via fax or email, is processed on the front-end Web servers 140a and/or 140b. Front-end Web servers 140a and/or 140b grab data from the external data storage device 170 through the clustered back-end servers 160a and/or 160b, process the grabbed data, and then send (push) the processed data out of the web site via the same Internet channels on which the user entered, or through a telephone network as a fax.

The users' data stored in the external data storage device 170 may be shared among users while maintaining the confidentiality of each individual user's data. Also, dealers managing systems (DMS) of competitive dealers can be networked while maintaining confidentiality of individual data of each dealer. The web site aggregates data from the DMS's within its own system and provides the aggregate data in various market reports or other views to members. A process of obtaining this data is to dial-in to each member dealer's DMS a predetermined number of times a week (e.g., six times a week) to get the most up-to-date information. This can be carried out by the web site owner or contracted out to a third party. For example, the third party can extract data from various fields within dealer systems to provide the web site with specific information required for its product. Next, the third party can process the data to eliminate duplicate data, check for new versus old data, and combine the data into a standard file format. The standardized file is uploaded in the web site databases (back-end servers) where the data is aggregated in various market reports and becomes available to the web site's customers.

The aggregate data may be used by dealers to benchmark the dealers' market situations, to streamline their vehicles among the dealers' dealerships, and to better understand the dealers' marketplace. The aggregate data includes aggregates of at least one of each dealer's sales history and inventory, other dealers' inventories, a list of vehicles a dealer needs to sell, data relating to how certain dealers do with specific vehicles, book values of vehicles, description of vehicles, and offers on vehicles from other dealers.

Other organizations that would also benefit from the aggregate data or access to this group of dealers include credit unions, banks, leasing companies, auto auctions, automotive aftermarket suppliers, automotive insurance carriers, lenders who offer indirect lending programs to dealers, direct mail companies, and transportation and towing companies. For example, this feature allows dealers to use the aggregate data to determine which bank is most profitable to finance a vehicle. The aggregate data can also be put up for bid to dealers that do not participate in the DMS network.

The requests by dealers may require determination of a Smart Score, which is a method of ranking prospective buyers to determine those with the greatest probability of making an offer on a vehicle. The method of determining Smart Score is further described below. If the requests do not require determination of a Smart Score, then router 150 routes data such as dealer data to the external data storage device 170 via back-end servers 160a and 160b for storage. Back-end servers 160a and 160b operate as a database interface to the external data storage device 170.

Figure 2:
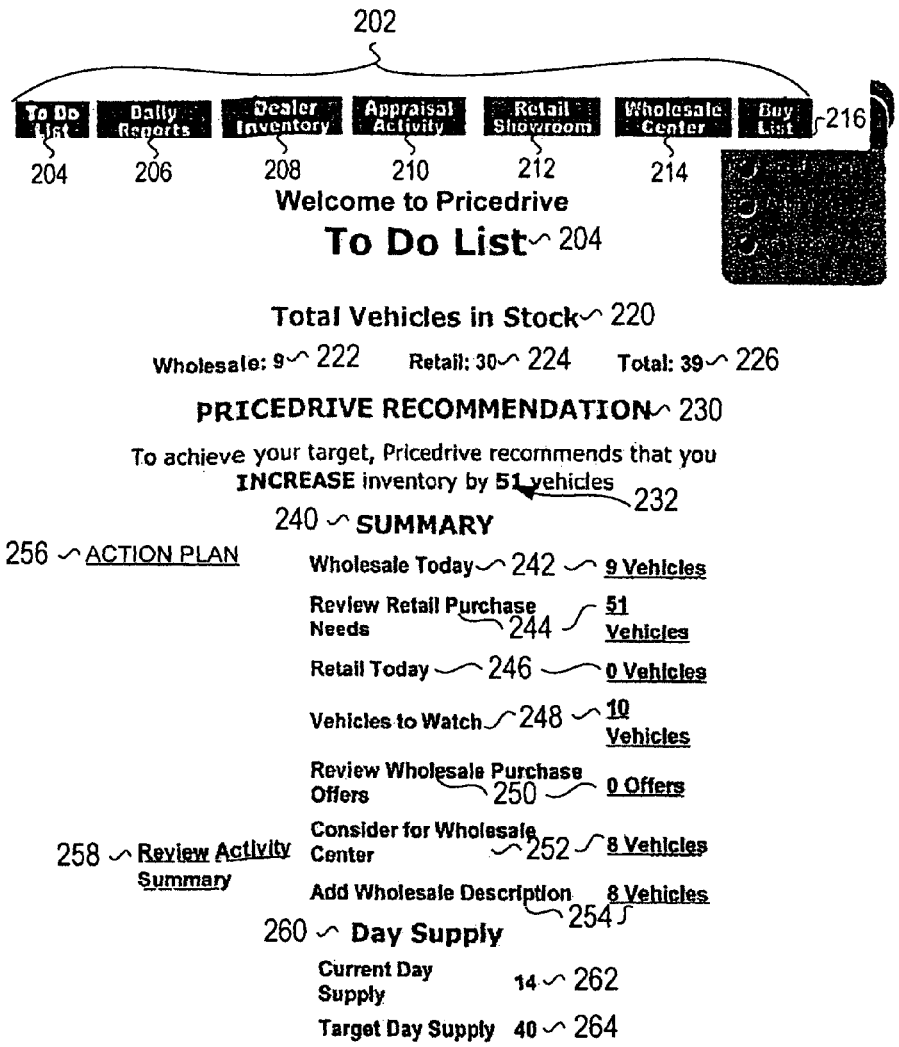
FIG. 2 is a screenshot of a main menu including a "To Do List" category of the main menu of an exemplary web site.
Figure 3A:
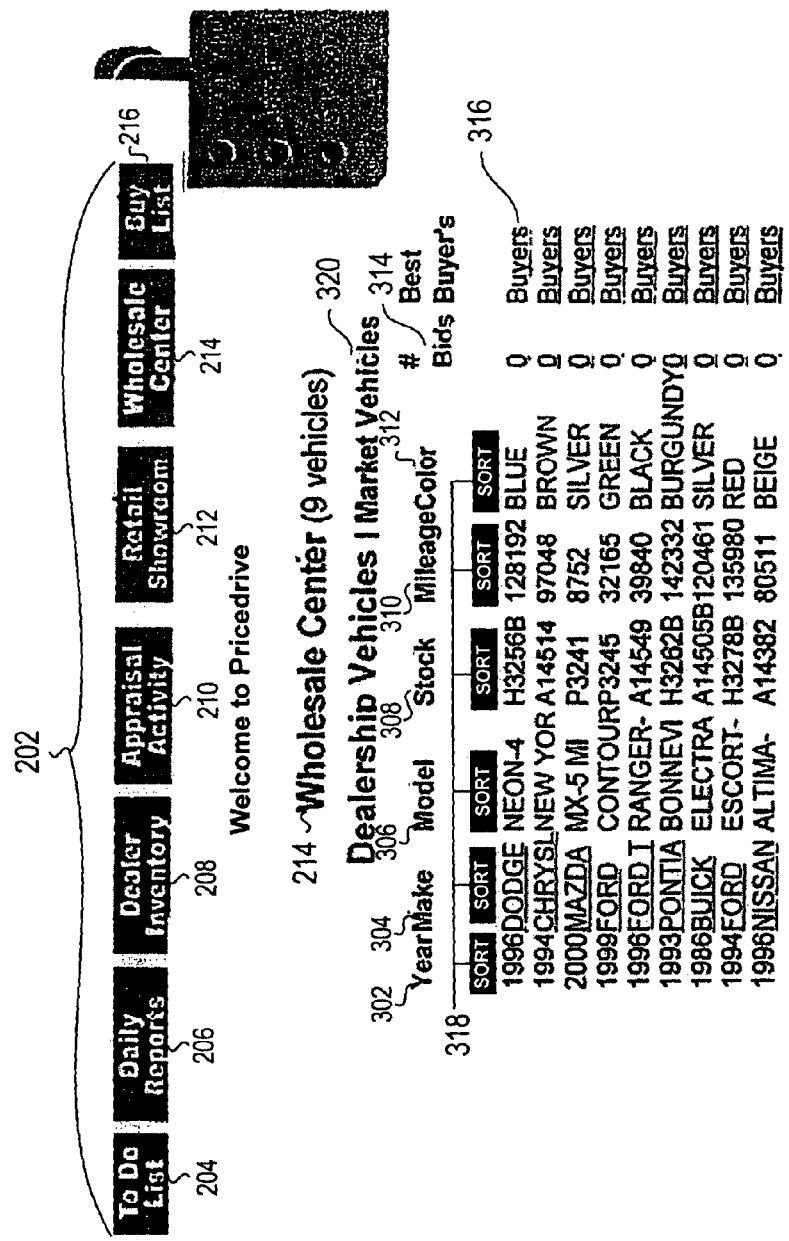
FIG. 3(a) is a screenshot listing vehicles for "Wholesale Today", which is a link to a screenshot listing a dealership's vehicles under the "Wholesale Center" category of the main menu of the exemplary web site.

FIG. 2 is a screenshot 200 of a main menu 202 of an exemplary web site providing dealers with an ability to view, for example, their daily "To Do List" 204. The main menu 202 includes the following categories: To Do List 204; Daily Reports 206; Dealer Inventory 208; Appraisal Activity 210; Retail Showroom 212; Wholesale Center 214; and a Buy List 216. A dealer elects a category by clicking on one of the categories and control then proceeds to carry out the selected category as illustrated and described in screenshots shown in FIGS. 2-17.

Each screenshot or page of the web site provides a dealer with information, and some screenshots may link to other screenshots which can be accessed by clicking on the desired buttons.

Screenshot 200 includes the To Do List 204 category of the main menu 202. The To Do List 204 provides an instant view of the dealership status and subsequent steps the dealership can take to attain higher productivity. The To Do List 204 may include a number of Total Vehicles in Stock 220, a Recommendation 230 to the dealership in order for the dealership to attain its goals, a Summary 240 of the dealership status, and a Day Supply 260 of the dealership. The number of Total Vehicles in Stock 220 includes a number of Wholesale 222 vehicles in stock, a number of Retail 224 vehicles in stock, and a Total 226 number of vehicles in stock, which is the sum of the numbers of Wholesale 222 and Retail 224 vehicles. The Recommendation 230 is a number of vehicles 232 the web site recommends the dealer to increase or decrease its retail inventory by. This number of vehicles 232 is based on a dealer-specific Target Day Supply 264 (the dealer-determined number of days that it should take to sell the entire inventory given its historical sales data). In particular, the system recommends the dealer to buy or sell its retail inventory by the number of vehicles 232 in order to meet its predetermined target retail inventory which matches the Target Day Supply 264. The number of vehicles 232 is determined by subtracting the number of Retail 224 vehicles from the predetermined target retail inventory to achieve the Target Day Supply 264.

The Summary 240 includes the following categories: a number of vehicles in Wholesale Today 242; a number of vehicles needing Review (for) Retail Purchase Needs 244, which links to Retail Sales Trend; a number of vehicles nearing Wholesale Center move date (Retail Today) 246; a number of Vehicles to Watch 248; a number of Wholesale Purchase Offers 250 needing review; a number of vehicles that should be Consider(ed) for Wholesale Center 252; a number of wholesale vehicles needing additional information (Add Wholesale Description) 254; an Action Plan 256; and a Review Activity Summary 258.

The number of vehicles in Wholesale Today 242 is the same as the number of Wholesale vehicles 222. Clicking on the Wholesale Today 242 category links a dealership to FIG. 3(a), which is a screenshot 300 of a listing of vehicles in the Wholesale Center 214. Vehicles in the Wholesale Center 214 are available for wholesale purchase. The Wholesale Center 214 listing includes each vehicle's Year 302, Make 304, Model 306, Stock number 308, Mileage 310, Color 312, Number of Bids 314, and Buyers 316. Clicking on the Buyers 16 provides the dealer with a list of potential buyers and their Smart Scores. The Smart Score is further described below. The Wholesale Center list can be sorted by year, make, model, stock number, mileage, and color by clicking on the corresponding Sort buttons 318.

Moreover, clicking on the Total Number of Bids 314 on a vehicle 352 with at least one bid links a dealership to FIG. 3(b), which is a screenshot of Wholesale Center Offers 350 for the vehicle 352. The Wholesale Center Offers 350 lists the VIN 354, Year 356, Make 358, Model 360, Mileage 362, and Color 364 of the vehicle 352. In addition, Wholesale Center Offers 350 lists the offers for vehicle 352 including High Offer Amount(s) 366, Site Area(s) 368, Offer Date(s) 370 (and time), and Dealer Name(s) 372. Clicking on a value amount 374 under the High Offer Amount(s) 366 provides information on the dealership that made the offer, and clicking "Sell Now?" 376 under High Offer Amount(s) 366 to sell the vehicle under the elected bid. The dealer making the bid never sees bids from other dealers, so the dealership as the seller can select to whom the dealership wants to sell the vehicle. Thus, the dealership can maintain its wholesale relationships while ensuring that it always gets fair market value for every vehicle. Thus, dealers have the ability to offer vehicle inventory for wholesale much earlier in their inventory cycle (when the vehicle is, e.g., 15-30 days old, instead of the typical 60 days), while still continuing to offer the vehicle for retail sale. This allows dealers to analyze the wholesale value of all used vehicle inventories on a daily basis (wholesaling and retailing vehicles are not mutually exclusive). Accordingly, dealers will have the ability to sell their used vehicle inventory before they suffer large wholesale losses resulting from depreciation. Dealers can also view other regional dealer vehicles up for auction or bidding by clicking on Market Vehicles 320 on screenshot 300 (FIG. 3(*a*)).

Dealers can also make offers on the Wholesale Center vehicles as shown in FIG. 3(*c*). A dealer can enter a Minimum offer 375 and a Maximum offer 380 or just a Maximum offer 380. A dealer can also enter comments in box 385 and click on Submit button 390 to submit the offer. If a dealer enters both a Minimum offer and a Maximum offer 380, then the offer will be displayed to the seller as the dealer's minimum offer or a predetermined amount of dollars (e.g., $50) more than a competing offer up to the maximum offer. The seller will notify the bidding dealer if the offer is accepted.

The number of vehicles needing to be considered under Review Retail Purchase Needs 244 in the To Do List 204 is the same as the number of vehicles 232 recommended to be bought or sold in order for a dealer to meet its target retail inventory. Clicking on Review Retail Purchase Needs 244 links a dealership to FIG. 4, which is a screenshot 400 listing Retail Sales Trends of vehicles, which include, for example, a vehicle's Make 402, Model 404, quantity of vehicles sold over a predetermined number of days and/or months (Quantity Sold) 406, and current number of vehicles in stock (Current Stock) 408. The Retail Sales Trends review the dealership's volume dealers over multiple time periods and compare to the current retail inventory.

Figure 5:
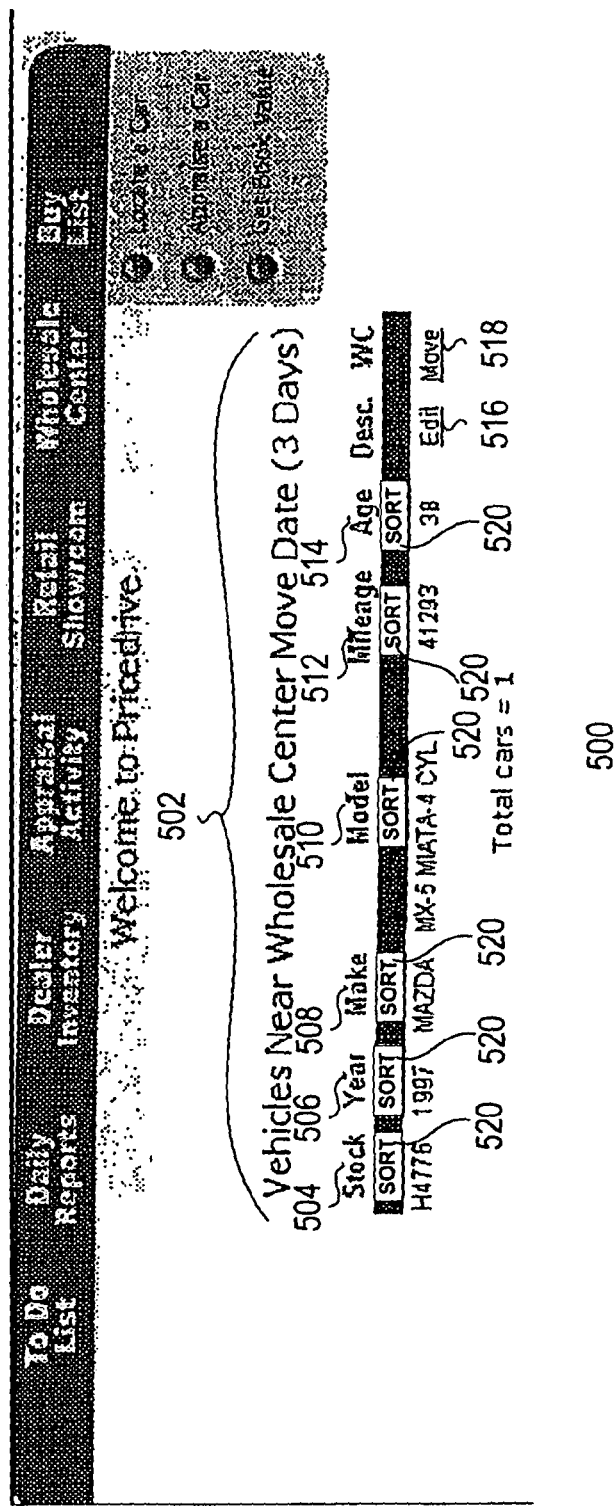
FIG. 5 is a screenshot of "Vehicles Near[ing] Wholesale Center Move Date (3 Days)", which is a link from "Retail Today" under the "To Do List" category of the main menu of the exemplary web site.

Clicking on Retail Today 246 under the To Do List 204 links a dealer to FIG. 5, which is a screenshot 500 indicating Vehicles Near(ing) Wholesale Center Move Date 502 as defined by each dealer (e.g., three days). Screenshot 500 provides a warning message that the vehicles under this list are nearing the Wholesale Center move date, and will automatically be moved to the Wholesale Center within a predetermined period as defined by each dealer. The screenshot further provides a Stock number 504, Year 506, Make 508, Model 510, Mileage 512, Age 514, a query to edit Description 516, and a query to move to Wholesale Center 518 for each vehicle. A user may also sort the vehicles in screenshot 500 by Stock number, Year, Make, Model, and Age by clicking on corresponding Sort buttons 520. To edit the description of a vehicle, a dealer can click on Edit button 516 for that vehicle. Similarly, to confirm a move of a vehicle to Wholesale Center, a dealer can click on Move button 518 for that vehicle.

Clicking on the Vehicles to Watch 248 under the To Do List 204 links a dealership to FIG. 6, which is a screenshot 600 listing vehicles that do not meet the dealership's administered settings, for example, vehicles that are nearing a predetermined Wholesale Center move date based on the vehicles' current days in stock 602, vehicles with no history available 604, vehicles having a below minimum ROI 606 (the calculation of ROI is discussed below), vehicles needing description 608, and/or vehicles that are overaged 610. In other words, this screenshot provides a Waning message 612 that these vehicles will be moved to the Wholesale Center 214 within a predetermined number of days. In addition, screenshot 600 provides the vehicles to watch Stock Number 614, Year 616, Make 618, Model 620, Average Days in Stock 622, Average Gross Profit 624, and Average ROI 626.

Figure 7:
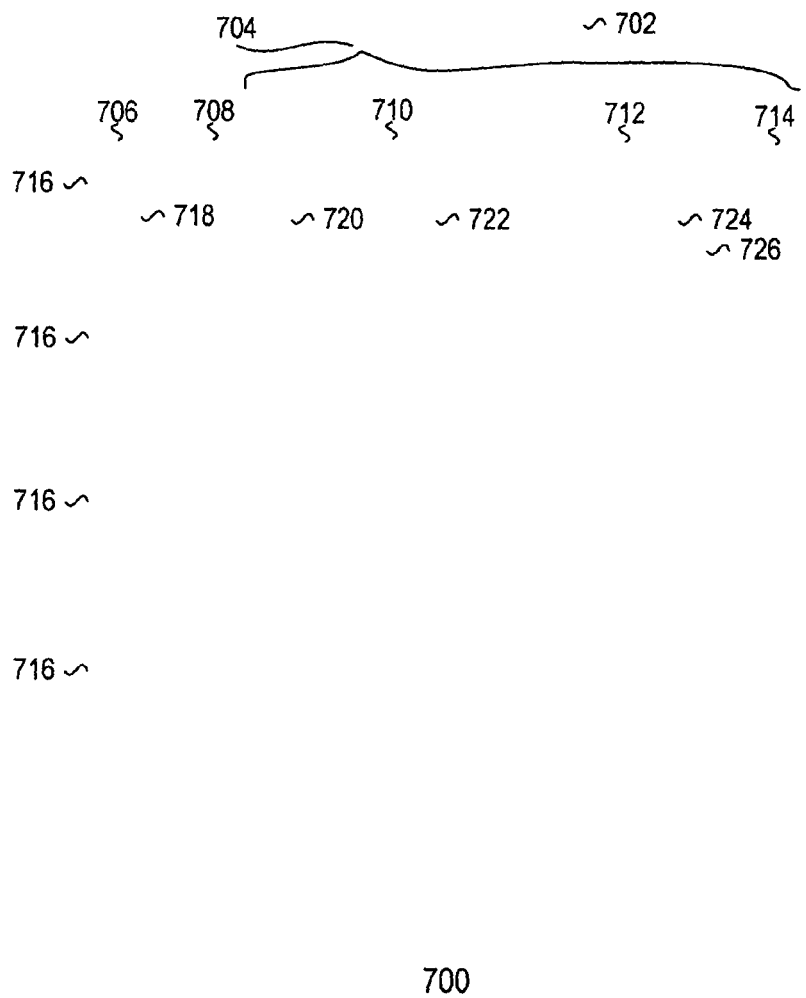
FIG. 7 is a screenshot showing review wholesale "Purchase Offers" under the "To Do List" category of the main menu of the exemplary web site.

Clicking on the Review Wholesale Purchase Offers 250 under the To Do List 204 links a dealership to FIG. 7, which is a screenshot 700 listing Purchase Offers 702 made for vehicles within a date and time range 704 to be reviewed. Screenshot 700 further provides for each particular vehicle, the Year 706, Make 708, Model 710, Stock number 712, and Details 714. Moreover, screenshot 700 lists for each vehicle 716: Site(s) of the offers 718; amounts of the Offer(s) 720; Date(s) and time of the offers 722; and Dealer(s) that made the offers 724. A selling dealer can get more detailed information regarding each vehicle by clicking on details 714. Similarly, a selling dealer can get more detailed information on the dealership making the offer by clicking on that dealership, e.g., Farrish Daewoo-Suzuki 726 in screenshot 700.

Clicking on the Consider for Wholesale Center 252 under the To Do List 204 links a dealership to FIG. 8, which is a screenshot 800 listing vehicles that the dealership should consider moving to the Wholesale Center 214 because the vehicles fall under at least one of the following exemplary categories: the vehicle's make and model historic average ROI does not meet the dealership's minimum ROI; the vehicle's mileage exceeds the dealership's set maximum mileage; the dealership has no history available for this vehicle's make and model; the vehicle is considered surplus retail inventory (overstock); or the vehicle is within a set days of the default Wholesale Center move age, e.g., three days. In particular, this feature of the system determines whether a vehicle meets its dealer's predefined goals; flags vehicles that do not meet their dealers' predefined gods; and places a Smart Score ranking of potential buying dealers for each of the flagged vehicles.

The Smart Score is described below and is based on a scoring model that a dealer or a potential buyer can update anytime and the scores that make up the Smart Score can be weighed and changed by a dealer or a potential buyer. It should be noted, however, that a selling dealer sets the scores that make up the Smart Score for a buying dealer. Screenshot 800 provides for each vehicle considered for Wholesale Center a vehicle's Stock number 802, a vehicle's Year' 804, a vehicle's Make 806, a vehicle's Model 808, a vehicle's Mileage 810, Current Days of vehicle In Stock 812, a predetermined period Average Gross Profit 814 of a vehicle, a predetermined average ROI Percentage 816 of a vehicle, a Warning 818 of why a vehicle should be considered for Wholesale Center 214, and a query whether to move the vehicle to the Wholesale Center 820.

Figure 9:
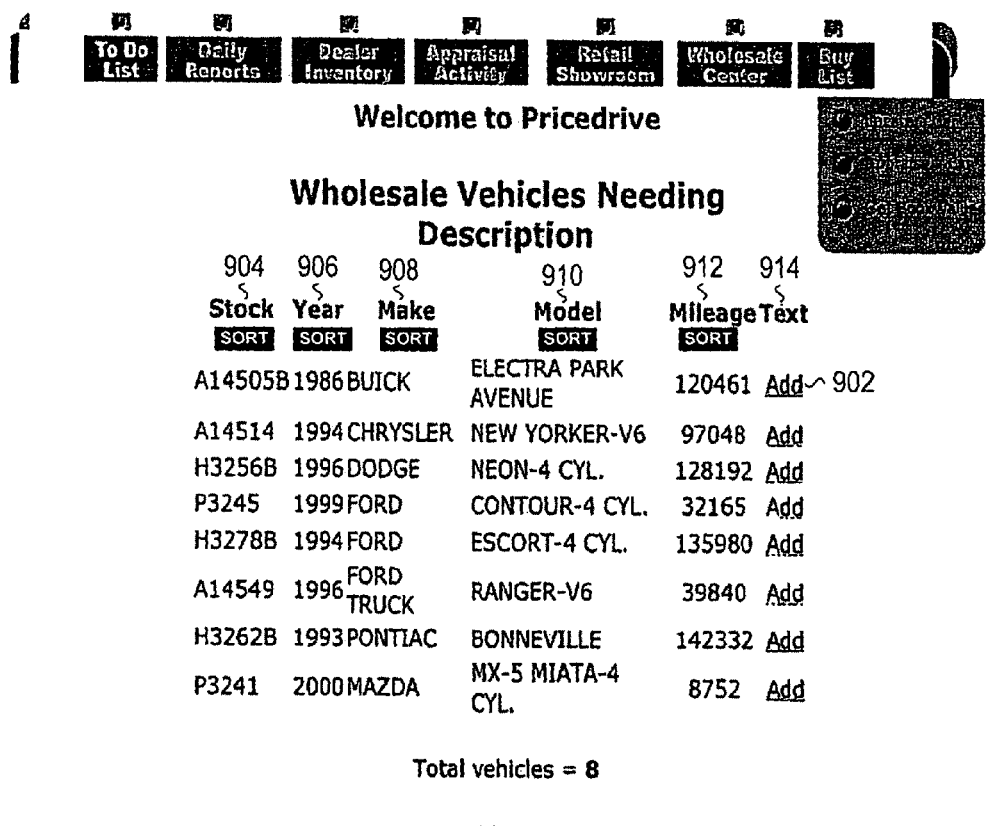
FIG. 9 is a screenshot listing "Wholesale Vehicles Needing Description", which is a link from "Add Wholesale Description" under the "To Do List" category of the main menu of the exemplary web site.

Clicking on the number of vehicles under Add Wholesale Description 254 under the To Do List 204 links a dealership to FIG. 9, which is a screenshot 900 listing vehicles in the Wholesale Center that do not have a text or voice description. The dealership can add text description of these vehicles by clicking on add button 902 on the screen. Screenshot 900 further provides for each vehicle needing a description a Stock number 904, Year 906, Make 908, Model 910, Mileage 912, and Text 914. The dealership may also add voice description of the vehicles through the telephone network 197 and voice recognition server 195.

Clicking on the Action Plan 256 under the To Do List 204 links a dealership to FIG. 10, which is a screenshot 1000 providing the dealership with warnings of vehicles in retail inventory. Screenshot 1000 provides each vehicle's Stock Number 1002; Year 1004; Make 1006; Model 1008; Warning 1010 such as add description to vehicles, vehicles are overaged, and/or vehicles are below minimum ROI; Current Days in Stock 1012; and status of ROI 1014. Based on the warnings of the vehicles in retail inventory, the dealership can take appropriate action such as moving the vehicles to the Wholesale Center as necessary.

Clicking on the (review) Activity Summary 258 (for a predetermined community, e.g., Baltimore-Washington) under the To Do List 204 links a dealership to FIG. 11, which is a screenshot 1100 providing a summary of a total number of dealer inventory of a make 1102 of vehicles, a total number of offers 1104, and a total number of recently added (new) vehicles 1106 and a total number of recently deleted vehicles 1108. The total number of dealer inventory of a make 1102 of vehicles includes a Retail Showroom number of vehicles 1110, a Wholesale Center number of vehicles 1112, and an Appraisal Activity number of vehicles 1114. Similarly, the total number of offers 1104 includes a Retail Showroom number of offers 1116, a Wholesale Center number of offers 1118, and an Appraisal Activity number of offers 1120. The total number of recently added (new) vehicles 1106 and the total number of recently deleted vehicles 1108 each includes a number of Retail Showroom new vehicles 1122 and deleted vehicles 1124, a number of Wholesale Center new vehicles 1126 and deleted vehicles 1128, and a number of Appraisal Activity for the new vehicles 1130 and the deleted vehicles 1132, respectively.

The Day Supply 260 under the To Do List 204 provides the number of Current Day Supply 262 and the number of Target Day Supply 264. The Current Day Supply 262 is the number of days it would take to sell a dealership's inventory based on the dealership's sales history and that dealership's current inventory. For example, the Current Day Supply 262 can be calculated by dividing the total retail inventory by the number of vehicles sold over the last predetermined number of days and multiplying the result by the predetermined number of days. The Target Day Supply 264 is a dealership-specific setting established by the dealership as a goal for the number of days of inventory on hand. The system helps dealers make their Current Day Supply 262 match their Target Day Supply 264.

The ROI is defined based on each vehicle, i.e., how much a dealership paid for a vehicle, the profit the dealership made from selling the vehicle, and the number of days the vehicle spent in inventory. In determining the ROI, the Actual Cost of Vehicle (ACV) is calculated first, which is:

$$ACV = (\text{Purchase Price of the vehicle} + \text{Reconditioning Cost})$$

or $ACV = (\text{Selling Price} - \text{Gross Profit})$.

Next, the Gross Profit is downloaded directly from the DMS or calculated as follows:

$$\text{Gross Profit} = (\text{Selling Price of vehicle} - ACV).$$

Finally, the ROI is calculated as follows:

$$ROI = (\text{Gross Profit}/ACV) \times (365/\text{Days in Stock}).$$

There are a couple of different ways that the ROI can be utilized. One way that this number is used is to average the ROIs for all the vehicles of each make/model/year/mileage range/price range, or any combination thereof of a given dealer. The dealer's average ROI by make and model, for example, is calculated as follows:

Average ROI=(Sum of ROIs of vehicles sold by dealer, make and model over last predetermined period of time)÷(number of vehicles sold by dealer, make and model over last predetermined period of time)

or Average ROI=(Avg(Gross Profit)/Avg(ACV))× (365/Avg(Days in Stock)).

To extend the calculation of ROI to a market ROI, the dealer is removed from the above equation.

The historical ROI may be based on at least one of a local marketplace, a regional marketplace (e.g., a county, a metropolitan area, a couple of states), or a national marketplace. The system further allows the dealer to limit bids from any unwanted bidders. Thus, the dealers have control over what dealers and wholesalers they do business with.

Smart Score is a method of ranking prospective buyers by multiplying weight and rank. Weights are values derived by applying the evaluation criteria under the categories as follows: how often a buyer bids on the web site; buyers with highest make and model sold in last 90 days; buyers with highest ROIs on any combination of make, model, year, price range, and/or mileage range; how often a buyer buys vehicles of the same year, make, and/or model; how often a dealer bids on a particular year, make, and/or model; whether a buyer is a member of a same dealer group; and whether a buyer has the year, make, and/or model on its Buy List. Ranks are values a dealer may place on the categories above to add additional biases beyond the web site weights assigned. Ranks may be updated in the web site.

As to the category of how often a dealer bids on the web site, each dealer is scored based on how many bids it made in the last predetermined number of days. For example, all dealers with at least five bids in the last 30 days are assigned a score of one for every five bids, with a maximum score set to 10. An exemplary weight calculation for this category is as follows:

| Quantity of Bids Made Over Last 30 Days | Weight |
|---|---|
| 0-4 | 0 |
| 5-9 | 1 |
| 10-14 | 2 |
| 15-19 | 3 |
| 20-24 | 4 |
| 25-29 | 5 |
| 30-34 | 6 |
| 35-39 | 7 |
| 40-44 | 8 |
| 45-49 | 9 |
| 50+ | 10 |

As to the category of which buyer has the highest number of make and model sold in the last predetermined number of day, each dealer is scored on how many vehicles of the same make and model it sold over the last, e.g., 90 days. The score is then assigned according to the following exemplary ranges:

| Quantity Sold Last 90 Days | Weight |
|---|---|
| <=3 | 0.0* 10 * 5/3 |
| >3 and <=7 | 0.1* 10 * 5/3 |
| >7 and <=11 | 0.4* 10 * 5/3 |
| >11 and <=15 | 0.6* 10 * 5/3 |
| >15 and <=19 | 0.8* 10 * 5/3 |
| >19 | 1.0* 10 * 5/3 |

As to the category of which buyers have the highest ROIs on any combination of make, model, year, price range, and/or mileage range, each dealer is scored based on what its ROI for the make, model, year, price range, and/or mileage range has been over the past predetermined period (e.g., 6 months). The scoring is then assigned according to the following exemplary ranges:

1. For Make and Model:

| ROI: Make/Model | Weight |
| --- | --- |
| <75% | 0.0* 10 * 5/3 |
| >75% and <100% | 0.1* 10 * 5/3 |
| >100% and <125% | 0.4* 10 * 5/3 |
| >125% and <150% | 0.6* 10 * 5/3 |
| >150% and <175% | 0.8* 10 * 5/3 |
| >=175% | 1.0* 10 * 5/3 |

2. For Make, Model, and Year:

| ROI: Make/Model/Year | Weight |
| --- | --- |
| <75% | 0.0* 10 * 5/3 |
| >75% and <100% | 0.1* 10 * 5/3 |
| >100% and <125% | 0.4* 10 * 5/3 |
| >125% and <150% | 0.6* 10 * 5/3 |
| >150% and <175% | 0.8* 10 * 5/3 |
| >=175% | 1.0* 10 * 5/3 |

3. For Make, Model, and Price Range:

| ROI: Make/Model/Price Range | Weight |
| --- | --- |
| <75% | 0.0* 10 * 5/3 |
| >75% and <100% | 0.1* 10 * 5/3 |
| >100% and <125% | 0.4* 10 * 5/3 |
| >125% and <150% | 0.6* 10 * 5/3 |
| >150% and <175% | 0.8* 10 * 5/3 |
| >=175% | 1.0* 10 * 5/3 |

4. For Make, Model, and Mileage Range:

| ROI: Make/Model/Mileage Range | Weight |
| --- | --- |
| <75% | 0.0* 10 * 5/3 |
| >75% and <100% | 0.1* 10 * 5/3 |
| >100% and <125% | 0.4* 10 * 5/3 |
| >125% and <150% | 0.6* 10 * 5/3 |
| >150% and <175% | 0.8* 10 * 5/3 |
| >=175% | 1.0* 10 * 5/3 |

As to how often a buyer buys the same year, make, and/or mode, each dealer is scored based on how many and what combinations of the same year, make and model it has purchased over the last predetermined of days (e.g., 90 days). The scoring is assigned according to the following exemplary criteria and combinations:

| Attribute Combination | Purchased Over Last 90 Days | Weight |
| --- | --- | --- |
| Year and Make and Model | >=6 | 1.0* 10 |
| Year and Make | >=6 | 0.7* 10 |
| Make and Model | >=6 | 0.7* 10 |

As to how often a buyer bids on a particular year, make, and/or model, each dealer is scored based on how many and what combinations of the same year, make and model it has bid on over the past predetermined number of days (e.g., 90 days). The scoring is assigned according to the following exemplary criteria and combinations:

| Attribute Combination | Bids Over Last 90 Days | Weight |
| --- | --- | --- |
| Year and Make and Model | >=6 | 1.0* 10 |
| Year and Make | >=6 | 0.7* 10 |
| Make and Model | >=6 | 0.7* 10 |

As to being a member of a same dealer group, each dealer is scored based on its membership to any group that the vehicle's dealer belongs to. An exemplary scoring of this category is as follows:

| Common Dealer Group | Weight |
| --- | --- |
| Yes, Buyer is member of Seller's Group | 10 |
| No, Buyer is not a member of Seller's Group | 10 |

As to whether a buyer has the year, make, and/or model on its Buy List, a dealer is scored based on whether a vehicle the dealer is searching for matches an entry in its Buy List, scoring different values based on how close the match is. The scoring is assigned, for example, according to the following combinations:

| Attribute Combination | Weight |
| --- | --- |
| Year and Make and Model | 1.0* 10 |
| Year and Make | 0.7* 10 |
| Make and Model | 0.7* 10 |

The Smart Score for each prospective buyer is the sum of the scores of any combination of the above categories based on: how often a buyer bids on the web site (quantity of bids made over the last predetermined number of days); how many vehicles of the same make and model a buyer (dealer) sold over the past predetermined period of time; buyers with the highest ROIs based on any combination of make, model, year, price range, and/or mileage range over the past predetermined period of time; how often a buyer buys vehicles of the same year, make, and/or model; how often a buyer (dealer) bids on a particular year, make, and/or model; whether a buyer is a member of a same dealer group; and whether a buyer has the year, make, and/or model on its Buy List.

The Daily Reports 206 of the main menu 202 is described next. The Daily Reports 206 include a Retail Inventory Value Report 1200 as shown in FIG. 12, the Action Plan report 1000 as shown in FIG. 10, a Market Performance by Make and Model report 1300 as shown in FIG. 13, a Dealership Performance by Make and Model report that is similar to the Market Performance by Make and Model report 1300 but shows dealership performance (not shown), an Available Inventory report 1400 as shown in FIG. 14, the Retail Sales Trends report 400 as shown in FIG. 4, the Vehicles to Watch report 600 as shown in FIG. 6, and a Top Performing Vehicles report 1500 as shown in FIG. 15. The Retail Inventory Value Report 1200 provides a list of all the vehicles in a dealership's retail inventory. Specifically, the Retail Inventory Value Report 1200 provides the vehicles' Stock Number 1202, Year 1204, Make 1206, Model 1208, Mileage 1210, Retail Price 1212, Vehicle ACV 1214, average Black Book Value 1216, National Automobile Dealers Association (NADA) trade value 1218, and Current Days in Stock 1220. The Action Plan report 1000 is described above with regard to the Action Plan 256 under the To Do List 204.

The Market Performance by Make and Model report 1300 shows the make 1302 and model 1304 of a vehicle, and provides information regarding the number of vehicles sold of the make 1302 and model 1304 over the last predetermined period of time 1312 (e.g., months and/or days), the current number of the vehicles in stock 1314, an average gross profit over a period of time 1316 (e.g. six months), an average days to retail over a period of time 1318 (e.g., six months), and an average ROI over a period of time 1320 (e.g., six months). The information 1312, 1314, 1316, 1318, and 1320 are provided for each of the categories of price range 1306, mileage 1308, and year 1310. Moreover, each of the price range 1306, mileage 1308, year 1310, and the information 1312, 1314, 1316, 1318, and 1320 can be sorted by clicking on the corresponding sort buttons 1322.

The Dealership Performance by Make and Model report (not shown) provides similar information to the Market Performance by Make and Model report 1300 except at a dealership level rather than the market level.

The Available Inventory Report 1400 is a list of Wholesale Center or Appraisal Activity vehicles that match the dealership's Buy List as described below with FIG. 17, or vehicles that have an historic ROI higher than the minimum dealer ROI as well as a mileage under the dealer's maximum mileage setting. The Available Inventory Report 1400 includes the vehicles' Year 1402, Make 1404, Model 1406, Mileage 1408, Color 1410, Area 1412, Dealership Name 1414, Dealership Contact Name (e.g., salesperson) 1416, and Dealership Contact Number (e.g., telephone number) 1418. Each of the information 1402, 1404, 1406, 1408, 1410, 1412, 1414, 1416 and 1418 of the Available Inventory Report 1400 can be sorted by clicking on the corresponding sort buttons 1420. Moreover, a dealership can also print the Available Inventory Report 1400 by clicking on the "Printer friendly version of this page" 1422.

The Top Performing Vehicles report 1500 provides a list of top performing retail vehicles by dealership 1502 and a list of top performing retail vehicles by market 1520. Each of the top performing retail vehicles by dealership 1502 and top performing retail vehicles by market 1520 provides the vehicles' Year(s) 1504 and 1522, Make(s) 1506 and 1524, Model(s) 1508 and 1526, Volume(s) Sold 1510 and 1528, Average Gross Profit(s) 1512 and 1530, Average Days to Retail 1514 and 1532, and Average ROI(s) 1516 and 1534, respectively. The Top Performing Retail Vehicles by Dealership further provides a Click button 1518 to sort the Dealer Top Performance Report. Similarly, the Top Performing Retail Vehicles by Market provides a Click button 1536 to sort the Market Top Performance Report.

The Retail Sales Trends report, the Vehicles to Watch report, and the Action Plan report are described above and shown in FIGS. 4, 6, and 10, respectively.

The Daily Reports 206, either alone or in combination, provide the dealers with important information to optimize their business. That is, the Daily Reports 206 provide the dealers with various reports and comparisons that are based on at least one of a local marketplace, a regional marketplace, a national marketplace, a like-size dealership (e.g., comparisons of similar-sized dealers), and a like-make dealership (e.g., comparisons of dealers selling similar or same make vehicles). For example, the Inventory Value Report 1200 and the Action Plan report 1000 provide the dealers with information to evaluate and manage their inventories, develop strategies to limit depreciation and retain maximum resale value, and determine which vehicles need to be sold most urgently. Another example is the Retail Price 1212, Vehicle ACV 1214, Black Book value 1216, and NADA value 1218 together provide a dealership with real time market value of a used vehicle versus the book value of the vehicle. The market value provides the dealership with a value a buyer is willing to purchase that vehicle for versus a book value that lets the dealer know what the average price buyers have been paying in the past predetermined number of days for a similar type vehicle. That is, a dealer can instantly see its cash value of every used vehicle in inventory.

Figure 16A:
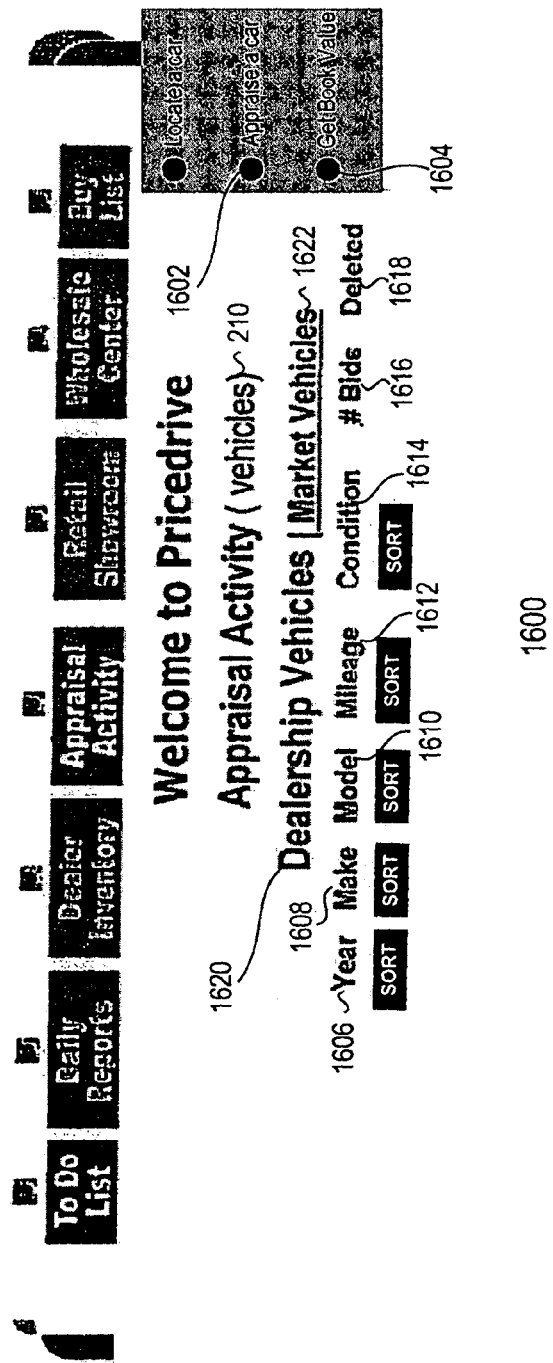
FIG. 16(a) is a screenshot of an "Appraisal Activity" category of the main menu of the exemplary web site.
Figure 16B:
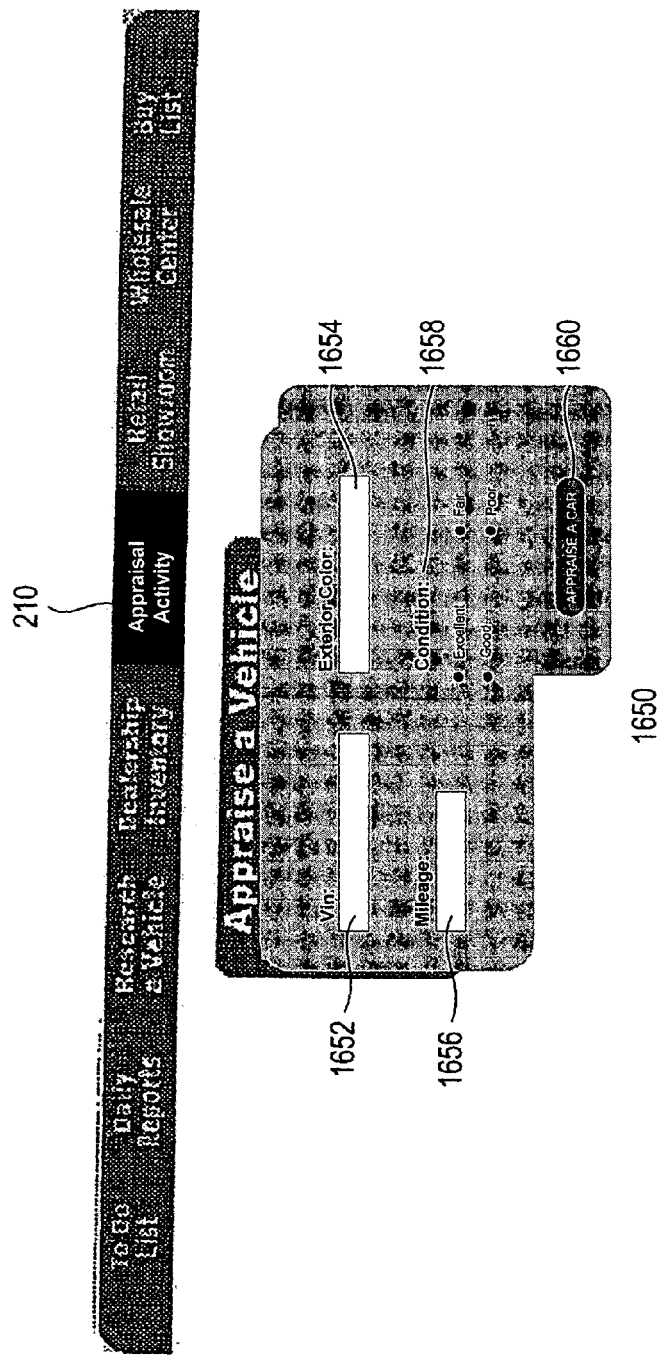
FIG. 16(b) is a screenshot showing how to place a vehicle to be appraised under the "Appraisal Activity" category of the main menu of the exemplary web site.
Figure 16C:
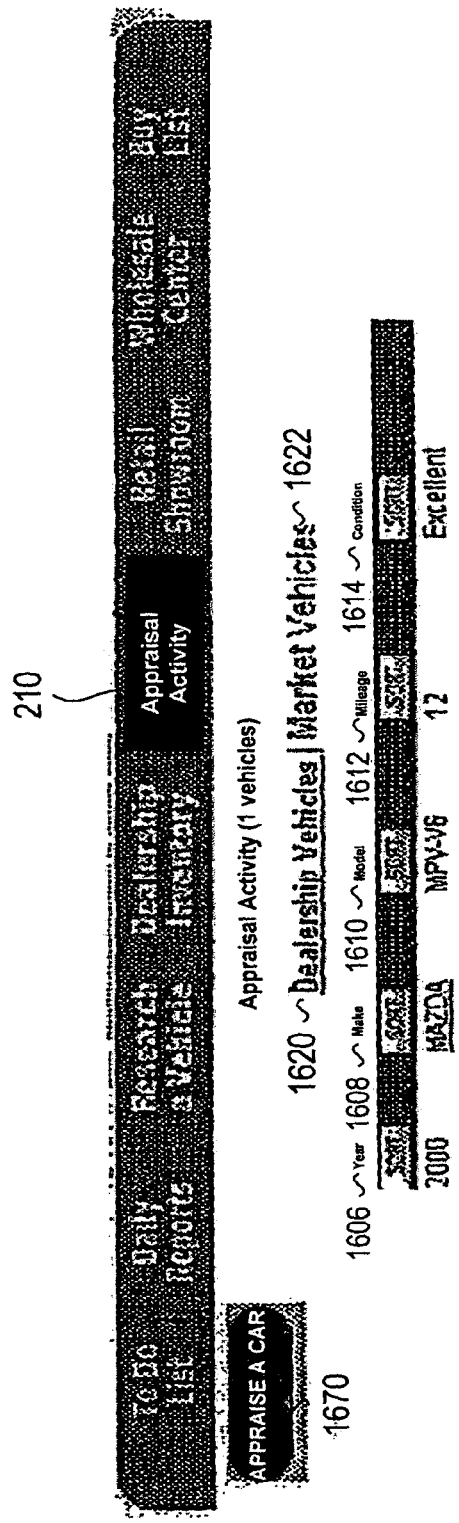
FIG. 16(c) is a screenshot showing a vehicle placed under an Appraisal Activity list of the exemplary web site.

FIG. 16(*a*) illustrates an Appraisal Activity screenshot 1600 of the Appraisal Activity category 210 under the main menu 200. The Appraisal Activity screenshot 1600 displays vehicles that dealers need to value quickly, for example, vehicles that a dealership may need to take in trade to finalize a deal. The list of vehicles includes each vehicle's Year 1606, Make 1608, Model 1610, Mileage 1612, Condition 1614, number of Bids 1616, and whether the vehicle has been removed or Deleted 1618. A dealership can view the list of vehicles submitted by it (Dealership Vehicles 1620) or vehicles submitted by all dealerships by clicking on Market Vehicles 1622. Appraisal Activity allows the dealership to have all of its trade-ins or in stock inventory instantly appraised by hundreds of dealers and wholesalers in a region by clicking on an "Appraise a Car" button 1602, which provides a link to screenshot 1650 as shown in FIG. 16(*b*) to be filled out in order to post a vehicle for view by other dealers. Screenshot 1650 allows the dealership to enter all relevant information of the vehicle (e.g., VIN 1652, Exterior Color 1654, Mileage 1656, Condition 1658, etc.) and to click on Appraise a Car button 1660 in FIG. 16(*b*) to enter the vehicle to be appraised as shown in FIG. 16(*c*). This allows the dealership to quickly gauge interest in a particular vehicle before accepting it as a trade-in. That is, the appraisal list allows a dealer to determine the value of each vehicle based on how much other dealers are willing to bid for it. All bids are instantly sent to the selling dealership and a bidding dealership is notified if the selling dealership accepts the bid or offer from the bidding dealership.

Dealers can also obtain historical data on recent trade-in values for a particular vehicle in their market via book values and aggregate market performance, which minimizes the price risk of selling used vehicles. Many dealers do not have accurate market values for their vehicles and suffer large wholesale losses by overvaluing used vehicle trade-ins, and miss retail sales opportunities by undervaluing used vehicle retail prices. With the appraisal and get book values features, the undervaluing price risk problem is minimized.

A dealership can also get book values on a vehicle by pressing the "Get Book Value" 1604, which provides the dealership with appraisals from, e.g., NADA and the Black Book. The dealership can see various body type/options combinations available for the vehicle by following the prompts on subsequent pages. For example, the dealership can receive a Vehicle Appraisal Report adjusted for vehicle options (not shown since body types and options combinations are information owned by third parties and licensed to the web site).

Figure 17A:
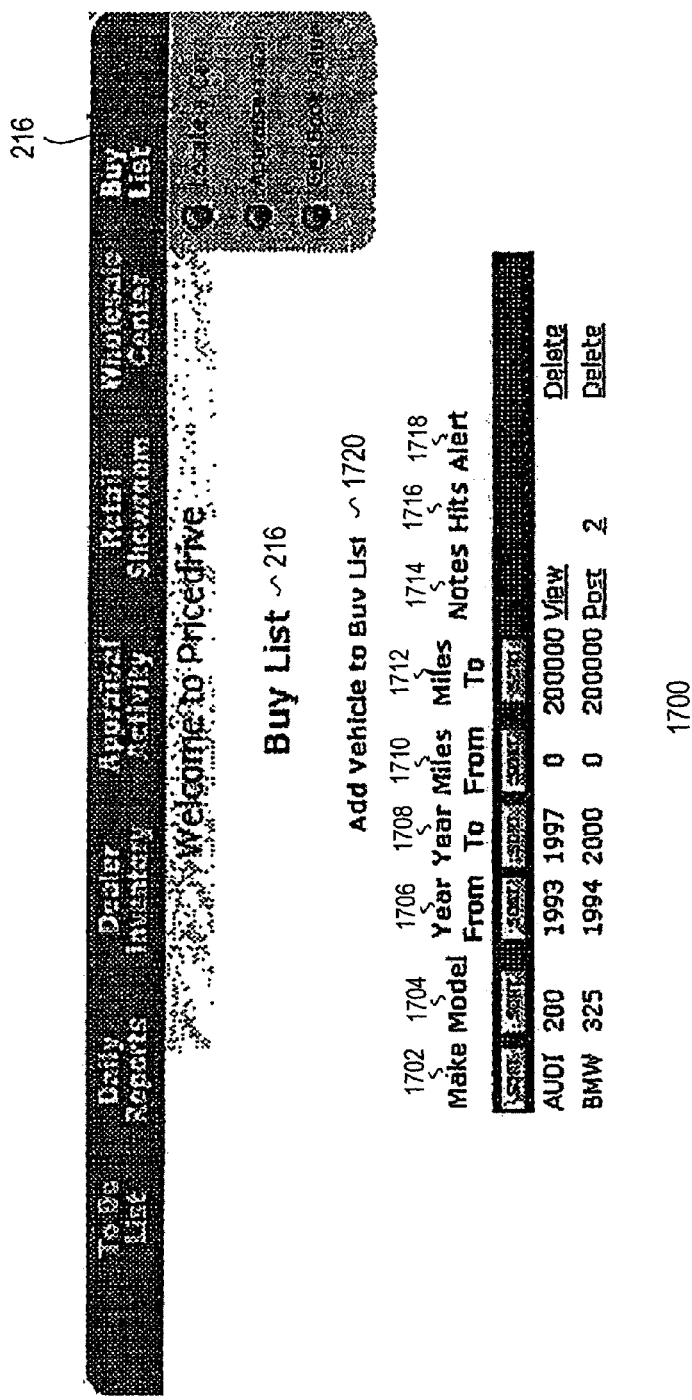
FIG. 17(a) is a screenshot of a "Buy List" category of the main menu of the exemplary web site.

FIG. 17(a) is a Buy List screenshot 1700 of the Buy List category 216 under the main menu 200 of the exemplary web site. The Buy List is a list of vehicles that a dealership wants to buy. The Buy List 1700 provides a list of vehicles by their Make 1702, Model 1704, Year From 1706 a make of a vehicle, Year To 1708 a make of a vehicle, Miles From 1710 (minimum mileage of a vehicle), Miles To 1712 (maximum mileage of a vehicle), Notes 1714 on a vehicle, number of Hits 1716 on a vehicle, and Alert 1718. A dealership can add vehicles to the Buy List 1700 by clicking on Add Vehicle to Buy List 1720.

Figure 17B:
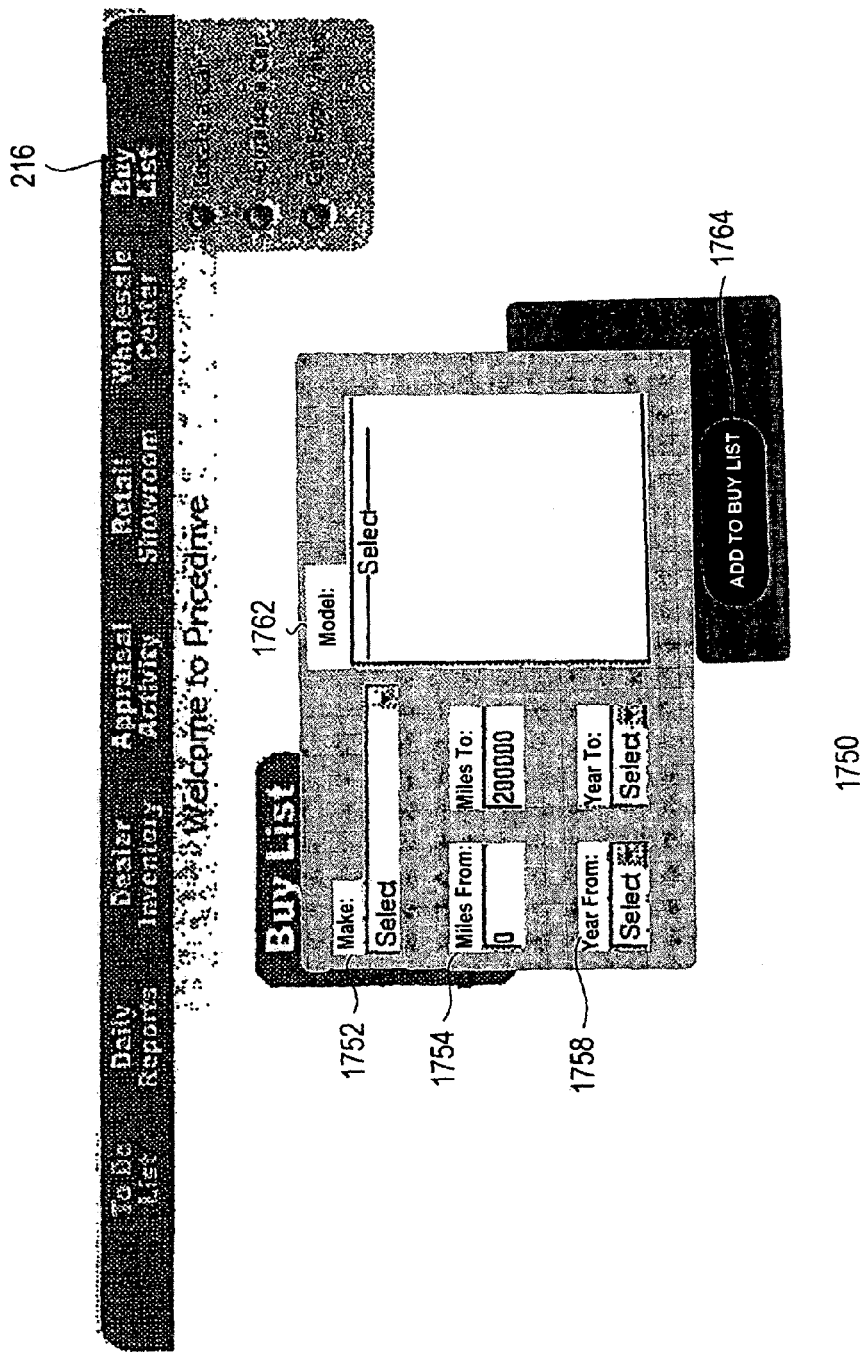
FIG. 17(b) is a screenshot showing how to "Add [Vehicles] to [the] Buy List" under the "Buy List" category of the main menu of the exemplary web site.

FIG. 17(b) shows a screenshot 1750 that is a link from Add Vehicle to Buy List 1720. Screenshot 1750 allows a dealership to add a vehicle to Buy List screenshot 1700 by querying the dealership to select a Make 1752 of the vehicle, Miles From 1754 (minimum mileage of a vehicle), Miles To 1756 (maximum mileage of a vehicle), Year From 1758 make of the vehicle, Year To 1760 make of the vehicle, Model 1762 of the vehicle, and Add to Buy List button 1764. Alert 1718 provides an alert to a dealership when any other dealer in the dealership's region adds to the web site a match either into their inventory or Appraisal Activity that the dealership has not reviewed. The number of Hits 1716 indicates the total number of matching vehicles in the web site's database, including the dealership's vehicles. Moreover, the web site provides the dealership with information such as the other dealers' needs and their locations, etc., in order for the dealership to complete its transaction. The web site can also have the dealership's Buy List linked to a WAP device so the dealership will always know when a vehicle it needs is available.

Specifically, a potential buyer of a used vehicle is alerted using at least a fax device, a desktop computing device, a portable message device, a portable voice device, a telephone, a pager, or the WAP device while maintaining confidentiality of individual data of each dealer. This wireless capability allows dealers and re-marketers to communicate and transact with their business-to-business partners. The dealers and re-marketers can conduct all their daily operations wirelessly, thus achieving tremendous cost and time savings. Dealers will have access to real-time vehicle information anywhere and anytime. The wireless extension provides dealers access to core functionalities of the web site using the WAP enable device. Currently, WAP is available for cellular phones, but it is foreseeable that the wireless extension will also work for any wireless device such as Palm Pilots, Pocket PCs, etc. The feasibility of wireless development exists with the web site due to the scaleable nature in which the site is developed. That is, each dealership is provided with a UserID and password, which it can use for both the desktop web site and wireless device. For example, a dealership can view a vehicle, offer details, and make and confirm vehicle offers via the desktop web site or a WAP device. In addition, each dealership can use the UserID provided to go online and get or provide additional data on the vehicles.

Dealers and re-marketers can also conduct many of their daily operations wirelessly. Dealers may have access to real-time vehicle information anywhere and anytime. The wireless extension provides dealers access to core functionalities of the web site using a WAP enable device.

While this invention has been described in conjunction with the specific exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

It will be apparent to one of ordinary skill in the art that the embodiments as described above may be implemented in many different embodiments of software, firmware and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The invention claimed is:

1. A method of scoring potential purchasing dealers within a network of competitive dealers, the method comprising:
   (a) obtaining, by a computer, sales history data for each of the purchasing dealers in the network, the sales history data corresponding to vehicles comparable to a vehicle for sale and including a plurality of sales indicators corresponding to prior sales made by the respective purchasing dealers, the plurality of sales indicators including at least two of i) number of bids made, ii) quantity of vehicles sold, iii) quantity of vehicles purchased, iv) frequency of bidding by the potential purchasing dealer, and v) return on investment for the vehicles comparable to the vehicle for sale;
   (b) assigning, by the computer, a score and a weight to each of the sales indicators for each of the potential purchasing dealers based on the sales history data, wherein the weight assigned to each of the sales indicators is based at least in part on the combination of sales indicators in the sales history data;
   (c) generating prior to receiving bids for the vehicle for sale, by the computer, a smart score for each potential purchasing dealer by aggregating the weighted assigned scores for the sales indicators, wherein the smart score indicates the likelihood that each purchasing dealer will bid on the vehicle for sale; and
   (d) ranking the potential purchasing dealers in the network based at least in part on the generated smart scores.

2. The method of claim 1, wherein the scores assigned to the sales indicators are assigned according to a normalized scale.

3. The method of claim, 1 wherein the scores assigned to the sales indicators for one of the potential purchasing dealers are relative to the sales history of the other purchasing dealers in the network.

4. The method of claim 1, wherein the sales history data of each individual purchasing dealer is confidential to the other purchasing dealers.

5. The method of claim 1, wherein the identity of each potential purchasing dealer is confidential to the other purchasing dealers.

6. The method of claim 1, wherein the scores assigned to the sales indicators for each potential purchasing dealer are confidential to the other purchasing dealers.

7. The method of claim 1, wherein the smart score for each potential purchasing dealer is confidential to the other purchasing dealers.

8. The method of claim 1, wherein the number of bids made is based on the number of bids a potential purchasing dealer made in the last predetermined number of days.

9. The method of claim 1, wherein the quantity of vehicles sold is based on the number of the same make and model the potential purchasing dealer sold over a predetermined number of days.

10. The method of claim 1, wherein the return on investment is based on the potential purchasing dealer's return on investment for the make and model vehicle purchased over a predetermined number of days, for the vehicle for sale.

11. The method of claim 1, wherein a potential purchasing dealer with a higher smart score is recommended to a selling dealer over a potential purchasing dealer with a lower smart score.

12. The method of claim 1, wherein a selling dealer selects at least one of the sales indicators used to generate the smart score for a potential purchasing dealer.

* * * * *